(12) United States Patent
Jenkins et al.

(10) Patent No.: US 8,880,461 B2
(45) Date of Patent: Nov. 4, 2014

(54) METHOD AND SYSTEM FOR MANAGING ENTERPRISE CONTENT

(75) Inventors: Paul Thomas Jenkins, Waterloo (CA); Daniel Wray Barkley, Ottawa (CA); Robert W. Boender, Chicago, IL (US); Adam Murray Howatson, Waterloo (CA); Willard Carter Morton, Jr., Western Springs, IL (US); Cheryl Lynne McKinnon, Kitchener (CA); Florian Müller, Sulzberg (DE); Martin Sumner-Smith, Palgrave (CA); Matthew David George Timmermans, Ottawa (CA)

(73) Assignee: Open Text S.A., Luxembourg (LU)

( * ) Notice: Subject to any disclaimer, the term of this patent is extended or adjusted under 35 U.S.C. 154(b) by 181 days.

(21) Appl. No.: 13/154,318

(22) Filed: Jun. 6, 2011

(65) Prior Publication Data
US 2011/0238649 A1 Sep. 29, 2011

Related U.S. Application Data

(63) Continuation of application No. 12/256,363, filed on Oct. 22, 2008.

(60) Provisional application No. 60/981,759, filed on Oct. 22, 2007.

(51) Int. Cl.
*G06F 17/30* (2006.01)
*G06F 7/00* (2006.01)
*G06Q 10/10* (2012.01)
*G06Q 10/06* (2012.01)
*G06F 9/44* (2006.01)

(52) U.S. Cl.
CPC .......... *G06Q 10/10* (2013.01); *G06F 17/30011* (2013.01); *G06Q 10/063* (2013.01); *G06F 9/4443* (2013.01)

USPC ........... 707/608; 707/705; 707/758; 707/790

(58) Field of Classification Search
CPC ... G06Q 10/10; G06Q 10/06; G06Q 10/0631; G06F 17/30557; G06F 17/30569
See application file for complete search history.

(56) References Cited

U.S. PATENT DOCUMENTS 7,302,431 B1 * 11/2007 Apollonsky et al. .................. 1/1
7,596,583 B2 9/2009 Chang et al. ............... 701/104.1

(Continued)

OTHER PUBLICATIONS

Non Final Office Action, U.S. Appl. No. 12/256,363 dated Apr. 26, 2012.

(Continued)

*Primary Examiner* — Sangwoo Ahn
(74) *Attorney, Agent, or Firm* — Winston & Strawn LLP

(57) ABSTRACT

A method and system for providing a consistent flow documents and data content across different organizational units of a company or agency where the documents and data come from different enterprise systems and data stores but are related to linked processes that share models for organizing the content in the business context and in a format that enables a user to relate the content to the process step or steps they are performing. The system includes a network service that enables a configuration utility to automatically discover the objects and metadata and provides for a mapping of selected fields of the metadata to regions displayed in the user interface view with provision for filtering the data by mapping selected fields to a user input form. Thereby, a business analyst can create solutions without writing and maintaining complex program logic for each combination of presentation environment, enterprise system and data store.

19 Claims, 18 Drawing Sheets

(56) References Cited

U.S. PATENT DOCUMENTS

| | | | |
|---|---|---|---|
| 7,620,902 B2 | 11/2009 | Manion et al. | 715/758 |
| 7,627,810 B2 | 12/2009 | Glazer et al. | 715/203 |
| 7,669,123 B2 | 2/2010 | Zuckerberg et al. | 715/273 |
| 7,672,995 B2 | 3/2010 | Balasubramanyan et al. | 709/204 |
| 7,680,882 B2 | 3/2010 | Tiu, Jr. et al. | 709/203 |
| 7,702,730 B2 | 4/2010 | Spataro et al. | 709/205 |
| 7,707,249 B2 | 4/2010 | Spataro et al. | 709/205 |
| 7,725,492 B2 | 5/2010 | Sittig et al. | 707/784 |
| 7,756,824 B2 | 7/2010 | Campbell et al. | 707/610 |
| 7,797,274 B2 | 9/2010 | Strathearn et al. | 707/609 |
| 2002/0049603 A1 | 4/2002 | Mehra et al. | 705/1 |
| 2002/0073236 A1 | 6/2002 | Helgeson et al. | 709/246 |
| 2003/0126122 A1* | 7/2003 | Bosley et al. | 707/3 |
| 2003/0191719 A1 | 10/2003 | Ginter et al. | 705/54 |
| 2003/0212654 A1 | 11/2003 | Harper et al. | 707/1 |
| 2004/0102990 A1 | 5/2004 | Jones | 705/1 |
| 2005/0108153 A1 | 5/2005 | Thomas et al. | 705/39 |
| 2005/0138081 A1 | 6/2005 | Alshab et al. | 707/200 |
| 2006/0069717 A1 | 3/2006 | Mamou et al. | 709/203 |
| 2006/0205518 A1 | 9/2006 | Malabuyo et al. | 463/43 |
| 2007/0083421 A1 | 4/2007 | McNair et al. | 705/10 |
| 2007/0260476 A1 | 11/2007 | Smolen et al. | 705/1 |
| 2007/0266011 A1 | 11/2007 | Rohrs et al. | 707/3 |
| 2008/0065701 A1 | 3/2008 | Lindstrom et al. | 707/201 |
| 2009/0007098 A1 | 1/2009 | Chevrette et al. | 717/177 |
| 2009/0037277 A1 | 2/2009 | Zuckerberg et al. | 705/14 |
| 2009/0049525 A1 | 2/2009 | D'Angelo et al. | 726/4 |
| 2009/0070412 A1 | 3/2009 | D'Angelo et al. | 709/203 |
| 2009/0094224 A1 | 4/2009 | Ricket et al. | 707/5 |
| 2009/0112937 A1 | 4/2009 | Campbell et al. | 707/201 |
| 2009/0144392 A1 | 6/2009 | Wang et al. | 709/217 |
| 2009/0157608 A1 | 6/2009 | Strathearn et al. | 707/3 |
| 2009/0182589 A1 | 7/2009 | Kendall et al. | 705/5 |
| 2009/0182763 A1 | 7/2009 | Hawking | 707/102 |
| 2009/0234813 A1 | 9/2009 | Gutlapalli et al. | 707/3 |
| 2009/0249290 A1 | 10/2009 | Jenkins et al. | 717/109 |
| 2009/0249446 A1 | 10/2009 | Jenkins et al. | 726/3 |
| 2009/0254422 A1 | 10/2009 | Jenkins et al. | 705/11 |
| 2009/0265634 A1 | 10/2009 | Beringer et al. | 715/733 |
| 2009/0327848 A1 | 12/2009 | Glazer et al. | 715/201 |
| 2010/0057679 A1 | 3/2010 | King et al. | 707/3 |
| 2010/0094848 A1 | 4/2010 | Reddy et al. | 707/705 |
| 2010/0162375 A1 | 6/2010 | Tiu, Jr. et al. | 726/7 |
| 2010/0192070 A1 | 7/2010 | Peckelbeen | 715/748 |
| 2010/0241972 A1 | 9/2010 | Spataro et al. | 715/753 |
| 2011/0238650 A1 | 9/2011 | Jenkins et al. | 707/706 |
| 2011/0246444 A1 | 10/2011 | Jenkins et al. | 707/711 |

OTHER PUBLICATIONS

Non Final Office Action, U.S. Appl. No. 12/256,342 dated May 16, 2012.
Final Office Action, U.S. Appl. No. 12/256,369 dated Apr. 17, 2012.
Restriction Requirement, U.S. Appl. No. 12/256,369 dated Jan. 13, 2012.
Non Final Office Action, U.S. Appl. No. 12/256,369 dated Jul. 1, 2011.
International Search Report & Written Opinion for PCT/US08/80781 mailed Jul. 16, 2009.
Customizing and Administration Guide , Livelink® DocuLink for SAP® Solutions, Rev.: 30. Oct. 2006 © 2006 IXOS Software AG.
U.S. Appl. No. 12/256,342, filed Oct. 22, 2008.
U.S. Appl. No. 12/256,363, filed Oct. 22, 2008.
U.S. Appl. No. 12/256,369, filed Oct. 22, 2008.
U.S. Appl. No. 13/154,260, filed Jun. 6, 2011.
U.S. Appl. No. 13/155,246, filed Jun. 7, 2011.

* cited by examiner

METHOD AND SYSTEM FOR MANAGING ENTERPRISE CONTENT

CROSS-REFERENCE TO RELATED APPLICATIONS

This application is a continuation of U.S. patent application Ser. No. 12/256,363 filed Oct. 22, 2008 which claims the benefit of U.S. Patent Application No. 60/981,759 filed on Oct. 22, 2007. The entire disclosure of each prior application is expressly incorporated herein in its entirety by reference hereto.

COPYRIGHT NOTICE

The present application includes material that is subject to copyright protection. The copyright owner does not object to the facsimile reproduction of the application by any person as the application appears in the records of the U.S. Patent and Trademark Office, but otherwise reserves all rights in the copyright.

BACKGROUND

There are business processes wherein a worker needs to access data (also referred to as "structured data") and documents (also referred to as "unstructured data" and as "content") that are generated by a variety of different enterprise systems and stored in a variety of different data stores in order to perform some task that is consistent with their functional role in the organization. For example, a customer service representative would need access to a wide range of documents that originate from many different departments in order to perform the function of researching and responding to a customer inquiry.

It is common to find that the various different organizational units, hereafter described as "departments", in an organization—such as a for-profit company or a not-for-profit organization or the agencies comprising a government body—each develops its own system for creating and maintaining the documents that are produced by the department's processes. Many of these documents are required for efficient operation of another department's processes; however the department may lack an effective means for sharing those documents with other departments. For example, the department may lack awareness of the fact that another department has a need to use its documents in their process. This situation is frequently referred to as having "information silos" because the information content is stored in a manner that makes it difficult or impossible for other departments to find out what is stored. Even if the department is aware of the need for the documents of another department, the systems may lack interoperability, making it inefficient or, in some cases, impossible to access the documents directly from the processes in which they are needed.

Referring to the earlier example, in response to such an organization, each customer service representative could go into each of the different enterprise systems, or silos, separately in order to look up the data or search for the documents based on the parameters of the inquiry. However, this method would be very time consuming and would result in low user satisfaction and long turn-around times on the response to the inquiry.

Structured data can be organized in an Enterprise Resource Planning (ERP) system, so that individuals can easily access data originating from one process in other processes. However, ERP systems are not as effective in organizing the unstructured content data associated with the processes, especially if it is not directly linked to the structured data within the ERP system. For example, some of the unstructured content data may be created by processes that are outside of the control of the ERP system.

Documents can be organized in a shared file system or in a document management system so that individuals can easily access documents from any process. These file sharing methods only provide a partial solution to the problem stated above, because the information may not be organized in a manner that makes it possible to locate the correct data or document in a specific process step. Or, the method of looking up the data or documents may return so many candidates that it overwhelms the user who is trying to solve a specific problem.

A federated query system can be developed so that a search can be performed on each the different enterprise systems and the combined search results displayed for the user. The resulting display is, however, generic because they return results based on keywords and not context-specific results that would require additional data elements and their correlation to the query and, therefore, it is difficult for the business worker to understand the context of each search hit in order to focus attention on the data which is relevant to the problem at hand.

Methods for writing a software application may be specific to a business process and that presents the appropriate information from each separate enterprise system in a user interface that is optimized to the business process. It is expensive, however, to develop such a software application for each and every possible combination of business scenario and the different enterprise systems needed. It is even more expensive to develop such a software application for each of the many different application environments that may be needed for various business workers—for example, there may be a need for such software written for desktop applications, web-based applications, portal frameworks, and so forth. Furthermore, having developed such a software application, it is difficult and expensive to keep the application up to date whenever any of the other departments changes their process or the types and organization of their information content.

There are methods for creating a configuration utility in a given application environment that allows a business analyst to configure a presentation screen in that application environment by allowing the analyst to select from various metadata fields and choose the ones that are to be displayed in the presentation screen. An example of such a configuration utility is the DocuLink customizing screen that is available in the Open Text DocuLink application written in ABAP and presented to the user in the SAP(r) SAPGUI application environment. It is expensive, time-consuming, and inefficient, however, to develop and support such a configuration utility for each and every application environment such as the ones that were listed above.

Therefore, there is a need for a system and method that enables the set of software applications developed for different departmental processes to manage their information content in a consistent and structured manner and that is easy for business analysts to incorporate into systems that they design in order for the needed content to flow from the process of one department to those of other departments without having to hard-code content management logic into each and every application.

SUMMARY

A method and system can be directed to providing a consistent flow of documents and data content across different organizational units of a company or agency where the documents and data come from different enterprise systems and data stores but are related to linked processes that share models for organizing the content in the business context and in a format that enables a user to relate the content to the process step or steps they are performing. The system can include a network service that enables a configuration utility to automatically discover the objects and metadata and provides for a mapping of selected fields of the metadata to regions displayed in the user interface view with provision for filtering the data by mapping selected fields to a user input form. Using this method a business analyst can create solutions (design content flows) without writing and maintaining complex program logic for each combination of presentation environment, enterprise system and data store (or object context).

An apparatus is directed to providing, over a network, a user interface managing content of a plurality of different types. The apparatus may comprise: a metadata mapping component configured to perform actions. The actions may comprise: determining a model metadata configured for provisioning in a presentation framework, wherein the presentation framework is based on a role of a user and a process step within a business process; determining a first mapping of a key field of a content metadata of a requested content to a key field of the model metadata; determining a second mapping of an object property of the content metadata to an object property of the model metadata, wherein the object properties comprises at least one of a user interface object property, an event object property, or a service object property; and providing a interactive version of the content within the presentation framework based on the first and second mapping. The apparatus may further comprise a network service configured to provide interfaces over the network that comprises: an interface for receiving the role of the user and the process step; an interface for receiving a request for the content; and an interface for providing the presentation framework within a specific application associated with the content. The model metadata can comprise a dynamic folder model for organizing a visualization of a portion of the content within the presentation framework based on the first mapping and ordered by the second mapping, and wherein the content comprises a document. The apparatus may further comprise a content connection component configured to perform actions comprising: sending a discovery query for the content metadata for the content to a plurality of content repositories configured to store the content of the plurality of different types; and receiving the content metadata from a responding content repository. The apparatus may further comprise a content services component configured to perform actions comprising: determining a user-interface control provided through the presentation framework based on the model metadata and the content metadata, wherein the user interface control provides a generic content service or a custom content service. The apparatus may further comprise a workflow component configured to perform actions comprising: providing an event to a workflow process for automating a flow of the content between steps of the business process, based on the model metadata and the content metadata and an application specific event from a specific application managing the content. The apparatus may further comprise an authentication component configured to perform actions comprising: limiting access to the content or events for the content based on an authentication of the user. The apparatus may further comprise an auditing and reporting component configured to perform actions comprising: recording usage audit records for actions performed on the content within the presentation framework; and providing an optimization suggestion about a usage of the content within the business process based on the recorded usage audit records.

A computer-implemented method is directed to managing content of a plurality of different types. The method can comprise: receiving a request for visualizing a content; determining a model metadata configured for provisioning in a presentation framework, wherein the presentation framework is configured to interpret a user interface model (UI model) for rendering the content; sending a discovery query for the content to a plurality of content repositories configured to store the content of the plurality of different types; receiving a content metadata for the content from a responding content repository; determining a attribute-to-attribute mapping of a key field of the content metadata to a key field of the model metadata; determining an property-to-property mapping of an object property of the content metadata to an object property of the model metadata, wherein the object properties comprises at least one of a user interface object property, an event object property, or a service object property; and providing an interactive instance of a portion of the content within the presentation framework based on the property-to-property mapping and ordered by the attribute-to-attribute mapping. In one embodiment, the content can be configured to be managed by a user having a role and within a process step of a business process. The UI model may comprise platform independent user interface instructions, and wherein the UI model is configured to provide the content within the presentation framework based on the model metadata. Determining the attribute-to-attribute mapping may further comprise: filtering the key field of the content metadata using a metadata filter that restricts the key fields in order to limit the selection of objects displayed under the user interface object property. The metadata filter may be at least one of: a static filter defined at design time, a filter entered by a user, or an inherited filter based on the presentation framework, wherein the framework is a hierarchical view, and wherein the filter of a parent view is inherited to a child view of the parent view. The content may be a hierarchical business object with embedded objects configured to display information about at least one step of a business process. The presentation framework may be a hierarchical folder view that is configured to display content based on configured facet classifications. In one embodiment, the facet classifications comprise at least one of a count facet, or a filter facet. The response of the content may be a denial response that limits access to the content based on an authentication ticket of the user and/or may further be based on the processes step.

The method may further comprise determining a service-to-service mapping of a service object property defined in the model metadata and a service object property defined in the content metadata; providing a user-interface control through the presentation framework based on the service-to-service mapping. The user interface control may provide an action comprising at least one of: a foreign service provided by another content repository, a transformational service for transforming the content of a first type to another content of a second type, a creation service for creating a new content of the first type of the content, a rendition service for rendering the content, a enrichment-annotation service for changing the content metadata or associating another metadata with the content, wherein the other metadata comprises a tag to classifying the content, a tag to annotate the content, or a tag configured to be usable by a records management application, an archiving service, a records management service for managing the content within the records management application, a mash-up service, or any combination thereof. The method may further comprise determining an event-to-event mapping of an event object property defined in the model metadata and an event object property defined in the content metadata; and providing an event to a workflow process for automating a flow of the content between steps of the business process, based on the event-to-event mapping and an application specific event received from a specific application managing the content.

A system is configured for managing contents of a plurality of different types over a network. The system can comprise: a plurality of content repositories configured to store the contents of the plurality of different types; a client configured to perform actions comprising: sending a request for a content configured to be managed by a user having a role; displaying within a presentation framework, a displayable and controllable version of the content; and a flow manager server configured to perform actions. The actions may comprise: receiving a content metadata for the content from a responding content repository; harmonizing the content metadata to a model metadata; and providing the presentation framework comprising the displayable and controllable version of the content based on the harmonized metadata. The displayable and controllable version may further comprise a user interface control based on the harmonized metadata, wherein the user interface control comprising at least one of a menu or a menu-bar.

An application development framework is directed to software development for a productivity application environment. The application development framework may comprise: an computer component for receiving an abstract definition of interfaces for providing a plurality of content of different types discoverable and consumable within a process flow manager; a computer component for receiving a model metadata for the plurality of content of different types; and a computer component for generating computer readable instructions for operating the productivity application environment based on the abstract definitions and the model metadata, wherein a processor-executing instance of the computer readable instructions communicates with the process flow manager to provision a user interface object property, action object property, or event object property of the content within the productivity application environment. The productivity application environment may comprise at least one of a plurality of business enterprise applications.

The process flow manager may be configured to perform actions comprising: receiving a request for visualizing a content; determining a model metadata configured for provisioning in a productivity application environment, wherein the productivity application environment is configured to interpret a user interface model (UI model) for rendering the content. The actions may further comprise: sending a discovery query for the content to a plurality of productivity application environment configured to provide content of the plurality of different types. The actions may further comprise: determining an property-to-property mapping of an object property of the content metadata to an object property of the model metadata, wherein the object properties comprises at least one of the user interface object property, event object property, or action object property. The actions may further comprise: providing an interactive instance of a portion of the content within the productivity application environment based on the property-to-property mapping and ordered by the attribute-to-attribute mapping. The UI model can comprise platform independent user interface instructions, and wherein the UI model is configured to provide the content within the productivity application environment based on the model metadata. The abstract definition may be in Extensible Markup Language (XML).

An method is directed to providing a development framework for software development for a specific application environment. The method can comprise: receiving an abstract definition of interfaces for providing a plurality of content of different types discoverable and consumable within a process flow manager; a model metadata for the plurality of content of different types; and generating computer readable instructions for operating the specific application environment based on the abstract definitions and the model metadata, wherein a processor-executing instance of the computer readable instructions communicates with the process flow manager to provision a user interface object property, action object property, or event object property of the content within the specific application environment. The specific application environment may comprise at least one of a plurality of business enterprise applications.

The process flow manager may be configured to perform actions comprising: determining an property-to-property mapping of an object property of a content metadata that defines a content for visualizing within the specific application environment, to an object property of a model metadata, wherein the object properties comprises at least one of the user interface object property, event object property, or action object property; and providing an interactive instance of a portion of the content within the specific application environment based on the property-to-property mapping. The UI model may comprise platform independent user interface instructions, and wherein the UI model is configured to provide the content within the specific application environment based on the model metadata. The abstract definition may be in Extensible Markup Language (XML).

A system is directed to software development for a specific application environment. The system can comprise: an computer component for receiving an abstract definition of interfaces for providing a plurality of content of different types discoverable and consumable within a process flow manager; a computer component for receiving a model metadata for the plurality of content of different types; and a computer component for generating computer readable instructions for operating the specific application environment based on the abstract definitions and the model metadata, wherein a processor-executing instance of the computer readable instructions communicates with the process flow manager to provision a user interface object property, action object property, or event object property of the content within the specific application environment. The specific application environment may comprise at least one of a plurality of business enterprise applications.

The process flow manager may be configured to perform actions comprising: receiving a request for visualizing a content; determining a model metadata configured for provisioning in a specific application environment; sending a discovery query for the content to a plurality of content repositories configured to store the content of the plurality of different types; receiving a content metadata for the content from a responding content repository; determining a attribute-to-attribute mapping of a key field of the content metadata to a key field of the model metadata; determining an property-to-property mapping of an object property of the content metadata to an object property of the model metadata, wherein the object properties comprises at least one of the user interface object property, event object property, or action object property; and providing an interactive instance of a portion of the content within the specific application environment based on the property-to-property mapping and ordered by the attribute-to-attribute mapping. The UI model may comprise platform independent user interface instructions, and wherein the UI model is configured to provide the content within the specific application environment based on the model metadata. The abstract definition may be in Extensible Markup Language (XML).

A computer-implemented method is directed to analyzing data. The method can comprise: determining a model metadata of a content configured for provisioning within a presentation framework based on a process step within a business process; receiving a content metadata for the content from a selected one of a plurality of content repositories; determining an object property-to-object property mapping based on mapping the model metadata to the content metadata; providing the presentation framework that displays and controls an instance of the content based on the object property-to-object property mapping; and providing an analysis of a usage of the content within the business process. Providing the analysis may further comprise: recording usage audit records for navigation and control actions performed on the content while the content is provided through the presentation framework. The method may further comprise: processing the usage audit records through an analytics model to provide an indication of an efficiency or inefficiency in a usage of a plurality of content through the business process. The analytics model can comprise a determination of a number of clicks within the content, a time of usage of the content, a time of printing of the content, or a time of emailing the content. Providing the analysis can further comprise: determining a map flow of content through the business process based on the usage audit records.

The method can comprise: providing the map flow of the content within a plurality of swimlanes. The swimlanes can provide a visualization of the content usage at a time for at least one of a plurality of applications. The applications can comprise a Sales Force Automation application, a Contract Lifecycle Management application, a Sales order Administration application, a Shipping application, or a Customer Interaction Center application. The analysis of the usage of the content may be displayable at least one point within the map flow. Providing the analysis can further comprise: providing an optimization suggestion about the usage of the content within the business process based on the recorded usage audit records. The usage may be of an individual user, a group of users, or an organization usage.

A computer-implemented system is directed to analyzing data. The system can comprise: a process flow manager configured to provide a business process for providing visualization and services for a plurality of content of different types; and an auditing and reporting component configured to provide an analysis of a usage of the plurality of content within the business process. Providing the analysis can further comprise: recording usage audit records for navigation and control actions performed on the content while the content is provided through the presentation framework; and determining a map flow of plurality of content through the business process based on the usage audit records. Providing the analysis can further comprise: providing the map flow of the plurality of content within a plurality of swimlanes. The swimlanes can provide a visualization of the plurality of content usage at a time for at least one of a plurality of applications. The specific applications can comprise a Sales Force Automation application, a Contract Lifecycle Management application, a Sales order Administration application, a Shipping application, or a Customer Interaction Center application.

An apparatus is directed to analyzing data. The apparatus can comprise: a processor configured to perform actions comprising: determining a model metadata of a content configured for provisioning within a presentation framework based on a process step within a business process; receiving a content metadata for the content from a selected one of a plurality of content repositories; determining an object property-to-object property mapping based on mapping the model metadata to the content metadata; providing the presentation framework that displays and controls an instance of the content based on the object property-to-object property mapping; and providing an analysis of a usage of the content within the business process. Providing the analysis can further comprise: recording usage audit records for navigation and control actions performed on the content while the content is provided through the presentation framework. The actions can further comprise: processing the usage audit records through an analytics model to provide an indication of an efficiency or inefficiency in a usage of a plurality of content through the business process.

A user interface may be configured for displaying documents and data objects that are related by key fields, that includes a network service for accepting requests for models. In one embodiment, the network service obtains a list of available virtual folder models; for each virtual folder model, the network service obtains a list of content models; for each content model, the network service obtains a list of metadata fields; for any metadata field, the network service accepts a mapping to a key field; for any metadata field, the network service accepts a mapping to user interface elements; and for any user interface element, the network service accepts a mapping to a presentation framework. The presentation framework can provide for organizing related content models into hierarchical view such as a virtual folder model and including in the model the actions that can be performed by a user based on role and permissions so that these actions can be represented as controls in the user interface.

In one embodiment, for any user interface element, the network service can accept a metadata filter that restricts the key fields in order to limit the selection of objects displayed under the user interface element. In one embodiment, the network service produces an abstract definition of the interface configuration. In one embodiment, the network service produces an abstract definition of the object configuration. In one embodiment, the abstract definition is XML. In one embodiment, a network service transforms the abstract definition into computer readable instructions for a specific application environment.

In one embodiment, the specific application environment comprises SAP(r) SAPGUI, SAP NetWeaver Enterprise Portal, SAP WebDynpro, Microsoft Information Bridge Framework or Microsoft Visual Basic for Office Business Solutions (MS/OBA), Microsoft Line of Business Interface (LOBI), Microsoft SharePoint WebPart Extensions, or JSR-168 portlets.

Metadata harmonization as described herein may comprise a data mapping or translation facility that relates content from different sources based on metadata fields that are not identical but where a relationship can be computed. For example, in System A customer X would be identified as "Acme Ltd." While in System B, customer X would be identified as "12345".

A computer-readable storage medium can comprise instructions executable by a processor to perforin at least some of the steps of at least some of the methods described above.

An apparatus can comprise a processor configured to perform at least some of the steps of at least some of the methods described above.

BRIEF DESCRIPTION OF THE DRAWINGS

Features of embodiments of the invention, its nature, and various advantages will be apparent from the following detailed description, taken in conjunction with the accompanying drawings in which.

DETAILED DESCRIPTION

Figure 1:
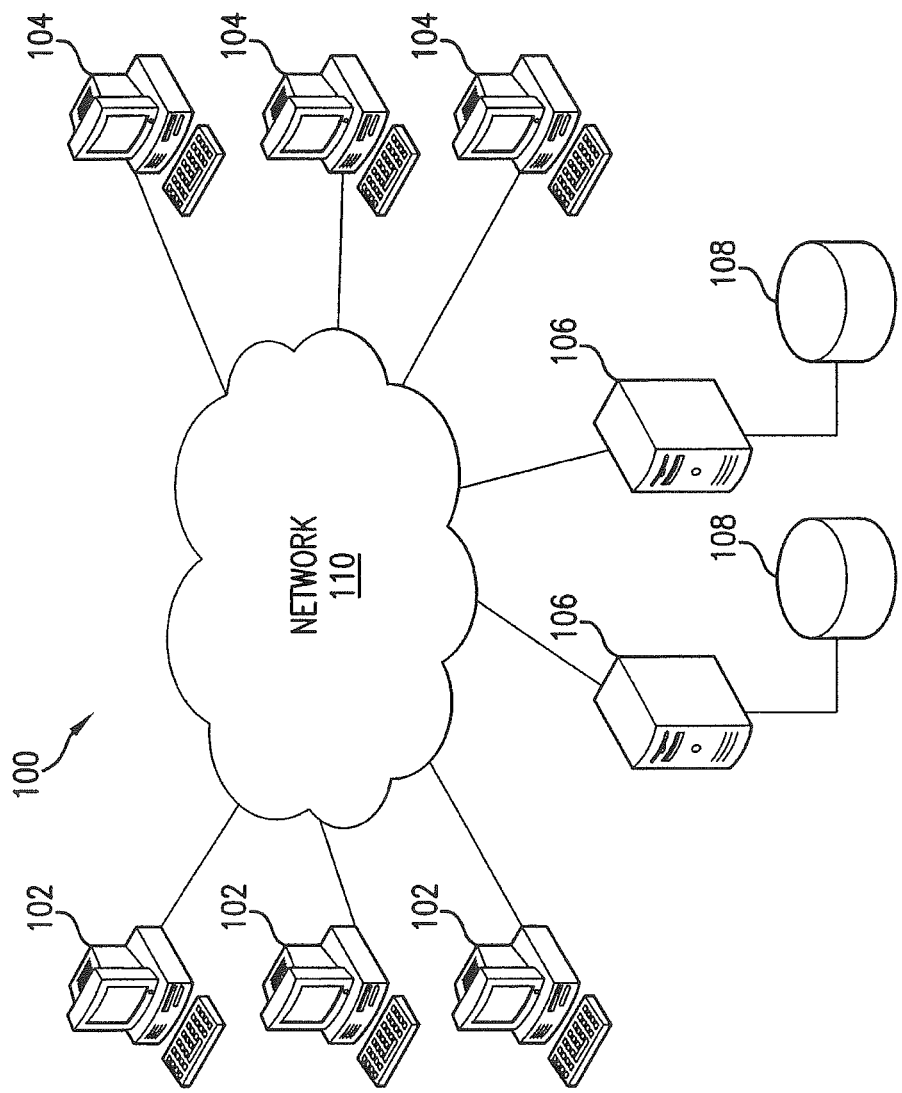
FIG. 1 schematically illustrates an exemplary system for supporting a the flow of content across departments of an organization.

Traditionally, the various departments in an organization have processes that may be well organized for the functions that take place within a department but which are not necessarily well organized to support the processes within a different department. The flows of structured data across the processes of an organization have been addressed by Enterprise Resource Planning (ERP) systems such as those from SAP® or Oracle®. However, the ERP systems are optimized for structured data and generally do not effectively manage the unstructured data or documents that are related to the processes.

Traditionally, organizations have relied on paper documents and paper file folders to organize the related documents and support the cross-departmental needs. The reliance on paper makes it less important for individuals in any given department to understand how those in a different department use the documents that are being filed because the individuals in the process can easily go through the documents in the folder manually and have many cues, such as labeled file drawers, tabbed sub-dividers, labeled file folders, and can scan the actual paper documents in order to find what they are looking for—even if they had not initially known how the documents are organized.

For several years, in order to automate manual business processes, organizations have been digitizing paper documents in the form of scanned images. Other documents are initially created in electronic formats using office automation software such as the applications in the Microsoft® Office Suite, engineering drawing applications such as AutoCAD® from AutoDesk®, or creative graphics applications such as those from Adobe®. These scanned images and electronic documents can be organized in the electronic equivalent of file folders and file cabinets. For example, organizations frequently rely on shared file folders or on document management systems for such organization.

These electronic file folders can be used in a similar manner to the physical file folder. In other words, an individual who is performing a role in a process can refer to the electronic file folder whenever a document is needed in that process, even if that document was created by a different department. Various methodologies have been developed to optimize the sharing of documents within file folders, such as labeling, classifications, and controlling the access to the file folders and documents. Records retention management systems have also been developed to help organizations control the disposition of file folders and documents, so that they can comply with policies that require that documents are available for audit and litigation procedures.

In many organizations, however, the content management procedures and the systems in which the electronic content is stored and used are quite disconnected. Rapid adoption of software applications used to create and modify unstructured documents has resulted in a proliferation of electronic content. These factors have resulting in a situation wherein content is unavailable to processes because the content is isolated from the process. The isolation may occur because the department that created the content may be unaware that another department may need it. Or, the isolation may occur because the department that needs the content does not have access to the system used by the department that created it.

All of the departments in an organization could join forces to analyze the various flows of content and reengineer all of their processes into an integrated system that optimizes the management and access to content so that it is available whenever and wherever it is needed. Such an initiative is unlikely, however, because it would be expensive, time consuming, and disruptive. If such an integrated system were developed, it would be expensive to maintain and upgrade over time, given requirements to keep in pace with new and modified document types and formats and to align to changes in the underlying platform infrastructure.

Alternatively, using the different methods, systems, apparatuses, or media disclosed herein, the software applications used by workers in various departments can be retrofitted to use a set of content services provided by an "ECM Flow Manager™".

The ECM Flow Manager supports these processes with the following optionally-deployable and mutually consistent components:

ECM Flow Model Repository™
Document Connect Engine
Workflow and workflow connection Engine
Content Services
Metadata Harmonization
Search engine
Common Authentication Framework
Auditing and reporting
Optimization Agent Overview of ECM Flow Manager The ECM Flow Manager most typically has a services oriented architecture (SOA), which promotes reuse of business logic across the entire organization and its processes. Thereby the software applications, each implementing a departmental process, can invoke one or more ECM Flow Manager services to enable content (or, access to content) to flow into or out of the process, and to enable individuals using the software application to access content regardless of the underlying content repository wherein the content is maintained. Furthermore, the ECM Flow Manager is model-based, which promotes a software design methodology whereby the business logic does not rely on hard-coded information structures, but rather connects to a model repository within the ECM Flow Manager for discovery of the structures used to represent the organization and visualization of related content, for methods used for accessing and enhancing content, and for reporting on content usage.

The ECM Flow Manager typically also has a role- and rule-based permission model which optionally enables it to manage access to the underlying content by requiring that the software applications consuming services from the ECM Flow Manager present credentials appropriate to access the underlying content repositories. The ECM Flow Manager includes a common authentication infrastructure to fulfill this requirement.

Finally, development of software applications using the ECM Flow Manager is model-driven, whereby standard development tools, such as Microsoft Visual Studio, SAP NetWeaver Visual Composer, and Eclipse, can be used to rapidly develop software based on models obtained from the ECM Flow Model repository.

ECM Flow Model Repository

The ECM Flow Model Repository optionally provides one or more services to enable applications to register, discover, and consume business content and its associated organizational models (folders, etc.), networks, materialized views, and/or dynamic folder models produced by other processes.

One repository service models business content in a manner that promotes the sharing of the content across otherwise disconnected processes. Each business content model enables a process, such as a process in a single department, to represent the content that originates in the process within a structure that is independent of how the content is actually stored and aspects of its creation that are not relevant to it subsequent utilization.

The business content of other processes are also represented in appropriate models, so that all processes have a consistent way to represent business content and can "discover" the business content of other processes.

Typically, the content is modeled at a higher level than individual documents. For example, a departmental process that creates a contract may represent the contract as a "contract binder" that contains various component documents, of various types and formats and along with the associated metadata, which may exist in several versions including preliminary information and drafts, rather than representing each document individually.

When a business content model is registered in the ECM Model Repository, the technical interface to access the content is also referenced, as are the set of metadata that is available for organizing and identifying the content. For example, the above referenced "Contract Binder" may be registered as residing in a specific SAP ERP system with the following metadata fields:

Contract Partner {Partner Name and ID, Location, Contact Person(s)}
Contract Name
Contract Initiation Date
Contract Expiration Date
Contract Roles {Administrator, Negotiator, Legal}

A second type of model in the ECM Model Repository is a dynamic folder model, which provides a high level organization of all of the content that flows across departments for a set of connected processes. For example, the content for an order-to-cash process might include related documents including RFPs, Quotes, Purchase Orders, Design Documents, Shipping Documents, Invoices, Delivery Notes, Correspondence, and Return and Repair Information.

Each department may maintain their documents in a separate content management system using a different business content model. The dynamic folder model represents the relationship of the business content models along with the way in which they are visually or logically represented in any of the software applications along the overall order-to-cash process. This model enables the individuals using a software application within a department to easily "discover" relevant and suitable content from other departments, regardless of where the content is physically stored and the totality of available metadata about the content. An advantage over the prior art is that this method dynamically adjusts to new content types, thereby eliminating the need to modify the software applications whenever any of the related processes are changed and new sources of business content are added.

The ECM Model Repository also enables the set of departmental software applications to enrich the business content that is "owned" by another department. Whereas a given department may have established processes for the management of content that are entirely sufficient for the intended purpose(s), the effective use of content produced by these processes by members of other departments is often likely to require additional information not countenanced in the design and implementation of the original process. For example, a contract binder may contain various documents and records associated with a contracting process which may be related to a sale of goods or services, or the procurement of goods or services, or any other situation in which two or more partners enter into a contract. The contract binder collects documents that are preliminary to the actual contract, documents produced during the contract drafting process, the actual contract, documents containing information required to perform on the contract, and documents such as amendments and correspondence that are produced during the term of the contract. These documents are produced and consumed by various departments in an organization and, therefore, can be also be said to "flow" across the organization.

These discussions have used examples of implemented and structured electronic process, however it is readily apparent that in many real-life situations implemented processes may not fully achieve their intended purposes, that users may incorrectly use or circumvent such processes, or that there may even be no established processes within certain departments. In such cases the needs to make available appropriate content to members of other departments is no less critical for the overall organization.

The ECM Flow Manager also provides a security and access control model that ensures secure access from each of the software applications used to implement and automate departmental processes. The access control model can be user, group, rule, or role based; may take into account process status, and is applied to the business content models and to the dynamic folder models.

Document Connect Engine

Another component of the ECM Flow Manager is the Document Connect Engine, which provides the services required to interpret the dynamic folder model and deliver the information to the software applications that implement business processes. The Document Connect Engine also maintains connectors to each of the underlying enterprise data and content repositories. As a result of the Document Connect Engine services, each user can easily access the content in, for example, a dynamic folder that is displayed in the software application that has been developed to automate the business process for his or her department and role.

The Document Connect Engine executes the queries required to retrieve information for the business content model from each of the underlying systems managing the content and organizes the results in a manner that is easily presented in various graphical user interface frameworks of the software applications that consume the dynamic folder model.

In order to perform these services, the Document Connect Engine connects to each of the underlying content repositories using authorization credentials appropriate for the role of the user and/or process stage, requests the metadata components for an instance of each business content model, and employs the metadata elements to create an appropriate visual representation that facilitates the understanding and use of the content for specific purposes. One typical such representation is a folder hierarchy. The folders may correspond to the folders of the source system, or they may be dynamic so that it is easy to render in a software application according to the requirements of the appropriate visualization framework. Examples of such visualization frameworks include Portals (such as Microsoft SharePoint™ Portal, SAP NetWeaver Portal, or Oracle Portal), desktop business productivity applications (such as Lotus Notes, Microsoft Office Business Applications, Duet™, SAP WebDynpro or SAPGUI), and generic desktop utilities (such as Microsoft Windows Explorer or the Open Text desktop client).

In order to make it easier for the user to find the precise content needed for their process, the Document Connect Engine provides for the use of filters that can be configured at the nodes or levels in a dynamic folder model. Filter types include static, input by the user, or inherited. A static filter is pre-set to a specific value as appropriate for the intended use. A filter that is input by the user may, for instance, be presented as a fill-in form with one or more fields prompting the user to enter one or more values or range of values, thereby enabling the user to better select the most appropriate content for their purposes. An inherited filter is configured to propagate the filter of the previous level of the hierarchy down to the next level.

In a typical application, the dynamic folder tree is requested with an initial filter value that is derived from the application or using data entered by the user. In this way, the initial content that is displayed to the user is related to the context of the process or the results of a user-entered query.

Workflow Engine

The ECM Flow Manager also enables the flow of content across departmental processes through a simple workflow and event notification capability. The ECM Flow Manager allows consumer processes to configure a set of events on the business content that is managed within the ECM Flow Manager framework. Consumer processes can subscribe to the events so that they are made aware of changes to the content that is managed by another process. The software application implementing the process can display the events that are appropriate for the permissions of the user and his role in whatever manner is appropriate or typical for that application and process. For example, the application may have an inbox or universal work list that collects and optionally prioritizes the events that are ready for the user of the application. Alternatively, the application can pass the event into a workflow process in order to further automate the flow of content.

The preferred embodiment of the ECM Flow Manager includes a workflow engine of its own, however in a typical application of content flow across departments it is expected that one or more of the processes that are being connected will have its own workflow engine. Therefore, the workflow engine in the ECM Flow Manager is not intended to replace the workflow engines of each process but rather to make it easier for those implementing content flow to implement the communication between processes and to implement content-centric rules that would be difficult or costly to implement in the departmental processes themselves.

However, the workflow engine ECM Flow Manager does support content-centric business processes through the design, instantiation, and execution of workflow process templates that model the steps of manual and automated typical of those found in organizations managing enterprise content.

Content Services

As described above, the ECM Flow Manager provides a set of models and a method for displaying and utilizing the metadata of content related to a business process in an appropriate visual framework, such as a virtual folder hierarchy, that is in the appropriate business context and user's role regardless of the source system or application that owns the content. The ECM Flow Manager also supports a set of content services that allows the user to work with the content without requiring knowledge of how to use the underlying system in which the content actually resides. These services are typically "read-only" actions such as fetch, download, view, zip, print, or fax. However, ECM Flow Manager also provides a service provider interface that may define other content services that are not read-only and are implemented through server-defined actions to perform some action, including creating new content, updating existing content in the owning repository, or transforming the content. Examples of actions that transform content are 1) archiving a content object from a first repository into a second repository and replacing the original content object with an object that provides restricted access to the archived content; and 2) declaring a content object as a record and transforming the content object as necessary or desired to classify and protect the content object under the retention schedule associated with the file plan.

The ECM Flow Manager also provides a set of content services that enrich the content without altering the content in the owning repository. Examples of enrichment services are rendition, annotation, profiling (i.e., adding metadata), and classification (e.g., according to business taxonomy and/or organizational records management file plan).

The ECM Flow Manager also provides a third set of content services that provision to the user a set of appropriate actions related by the needs of the user, independent of the origin of the content. For example, such a related service might allow the user to access a user interface component to display a map showing a geographic location specified in the metadata related to a content object, for example in a GIS application or through Google™ Maps or Microsoft Virtual Earth™. Such related actions are sometimes referred to as "mash-ups".

Metadata Harmonization

The dynamic display of related and relevant content depends on consistent metadata across disparate content repositories. For example, an application that flows content related to an organization's customers across different processes will need to have a single version of each customer.

Although it would be ideal if every organization could enforce metadata consistency across all of its applications and processes, it may not be feasible to modify each such application in order to enable effective content flow. Therefore, the ECM Flow Manager includes metadata harmonization. Such metadata harmonization is also referred to as master data management. The metadata harmonization mechanism allows the ECM Flow Manager to translate or map the values of metadata elements in business content models from one enterprise application or content repository to another, including the labels for these elements with provision for localization of values and labels according to the locale settings for the user interface.

Search Engine

The discovery of related and relevant content also depends on discovering the content in each of the content repositories. Typically, each content repository will expose services that enable external applications to discover content based on metadata and content. However, the quality of the search services offered by the external repositories will vary and the flow of content may depend on features that are not available in those native search services.

Therefore, the ECM Flow Manager includes an embedded search engine that may be used to extract content with metadata from the external content management repository into an embedded searchable index. In doing so, the ECM Flow Manager will be able to provide consistent results where advanced search features are required.

Common Authentication Framework

The ECM Flow Manager also supports the security models of the underlying enterprise applications and content repositories so that users only have access to the information that they are authorized to access.

ECM Flow Manager includes a common authentication framework that enables transparent authentication from the departmental software application through to each of the underlying enterprise applications and content repositories. The framework provides services to register authentication providers for the various authentication methods used by the departmental software applications. The framework also provides services to register drivers to traverse the authentication requirements of the underlying enterprise applications and content repositories. The framework maps the front-end application authentication through each of the drivers required to transparently access the authorized business content which is ultimately presented in the view available to the departmental software application—for example, as the dynamic folder view.

Auditing and Reporting

The ECM Flow Manager maintains a record of the requests, events, and content services in the context of the users and their roles, the processes, business content models, and dynamic folder models.

A reporting service is provided for producing reports from these records. In this way, the ECM Flow Manager enables an organization to document how users are using each specific business content component and collections as they flow across each of the organization's processes. In this way, the organization can understand the "big picture" of their enterprise content, which would be difficult or impossible to obtain by looking at the set of audit trails produced from accessing individual documents from each of the underlying enterprise applications and content repositories.

Optimization Agent

An organization that is using the ECM Flow Manager in one or more of their departmental processes also has the ability to monitor how individual users are performing in their roles with respect to the business content that they are creating and consuming. By analyzing the steps that a user performs in comparison to other users performing in the same process, the ECM Flow Manager can provide feedback to the individual user, to groups of users, and to the organization so that action can be taken to help user and groups to become more efficient and effective in the way that they use content.

Overview

A system to provide content flow across processes is shown schematically in FIG. 1. As shown in FIG. 1, the exemplary system 100 includes a plurality of clients 102 used by various individuals in a first department, a plurality of clients 104 used by various individuals in a second department, one or more servers 106 and databases 108. The clients 102 and 104, servers 106, and databases 106 communicate using one or more data communications networks 110.

Prior Art

Figure 2:
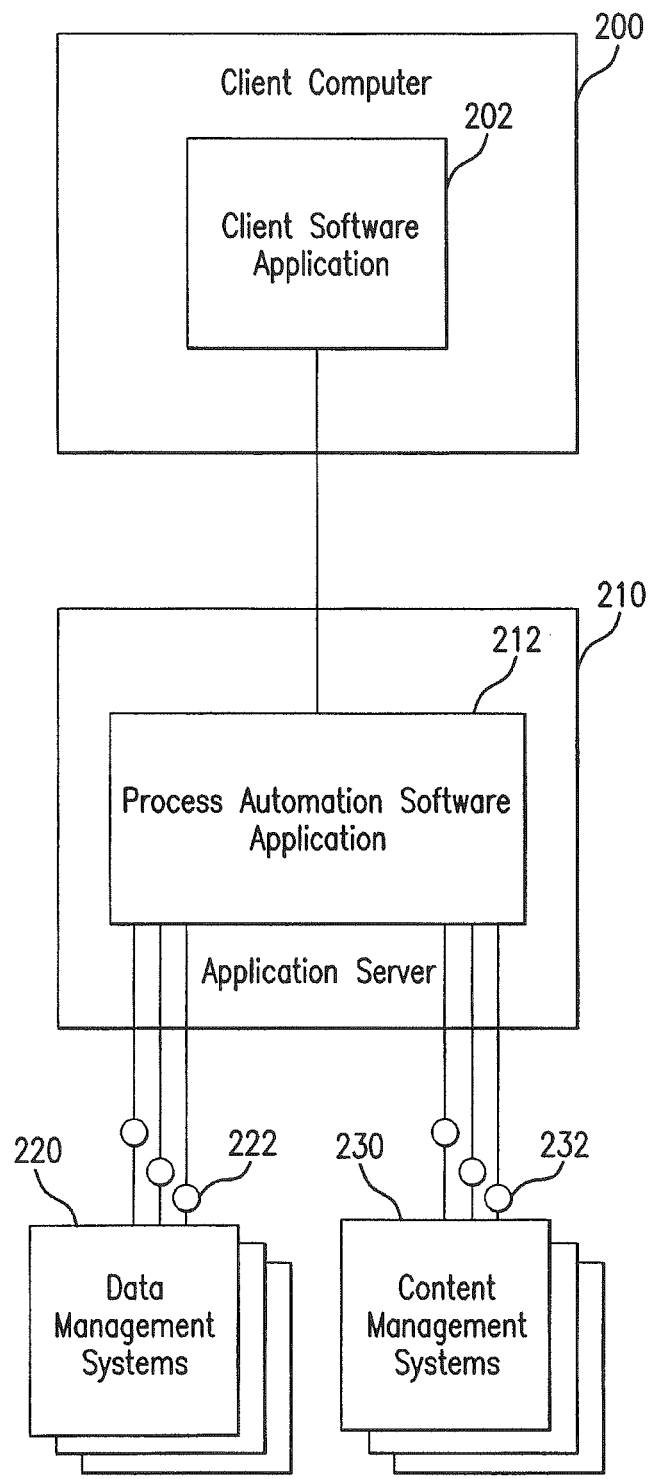
FIG. 2 schematically illustrates an exemplary system for supporting a departmental process in the prior art.

An illustrative example of the prior art is shown schematically in FIG. 2. As shown in FIG. 2, a client 200 that is running application software 202 that supports a departmental process requiring access to data residing in one or more data management systems 220 and content in one or more content management systems 230. The client includes application software 202 that implements program logic enabling the user at the client to interact with the data and content, performing such operations as creating, viewing, updating, and deleting information, all in the context of some business process.

The client software application 202 may directly access the data management systems 220 through application program interfaces 222 and the content management systems 230 through application program interfaces 232. If desired, the clients 200 may indirectly access the data and content through process automation software applications 212 operating on an application server 210 servicing a plurality of clients 200 in the department. In this case, the process automation software applications 212 connect to the data management systems 220 using application program interfaces 222 and to the content management systems 230 using application program interfaces 232.

The departmental business process that is automated by client software application 202 and process automation software 212 enable the user at client 200 to interact with the data and content residing in the underlying data management systems 220 and content management systems 230. In some prior art systems, the client software application 202 is a dedicated software application program installed at the client 200 and dedicated to a specific business process. In other prior art systems, the client software application 202 relies on features and functions of general purpose client software application frameworks, such as portals and web-browsers, for accessing the methods programmed in process automation software application 212 located in an application server 210. The connection between client application software 202 and process automation software application 212 may be dedicated using "hard-wired" connections or the connection may rely on network protocols of a network operating system. The methods may rely on user access to structured information in one or more data management systems 220 and unstructured information in one or more content management systems 230. Typically, one of these content management systems will belong to the department and be used primarily for processes that reside in the department, while the other data and content management systems will belong to other departments or be shared among two or more departments.

ECM Flow Manager

Figure 3:
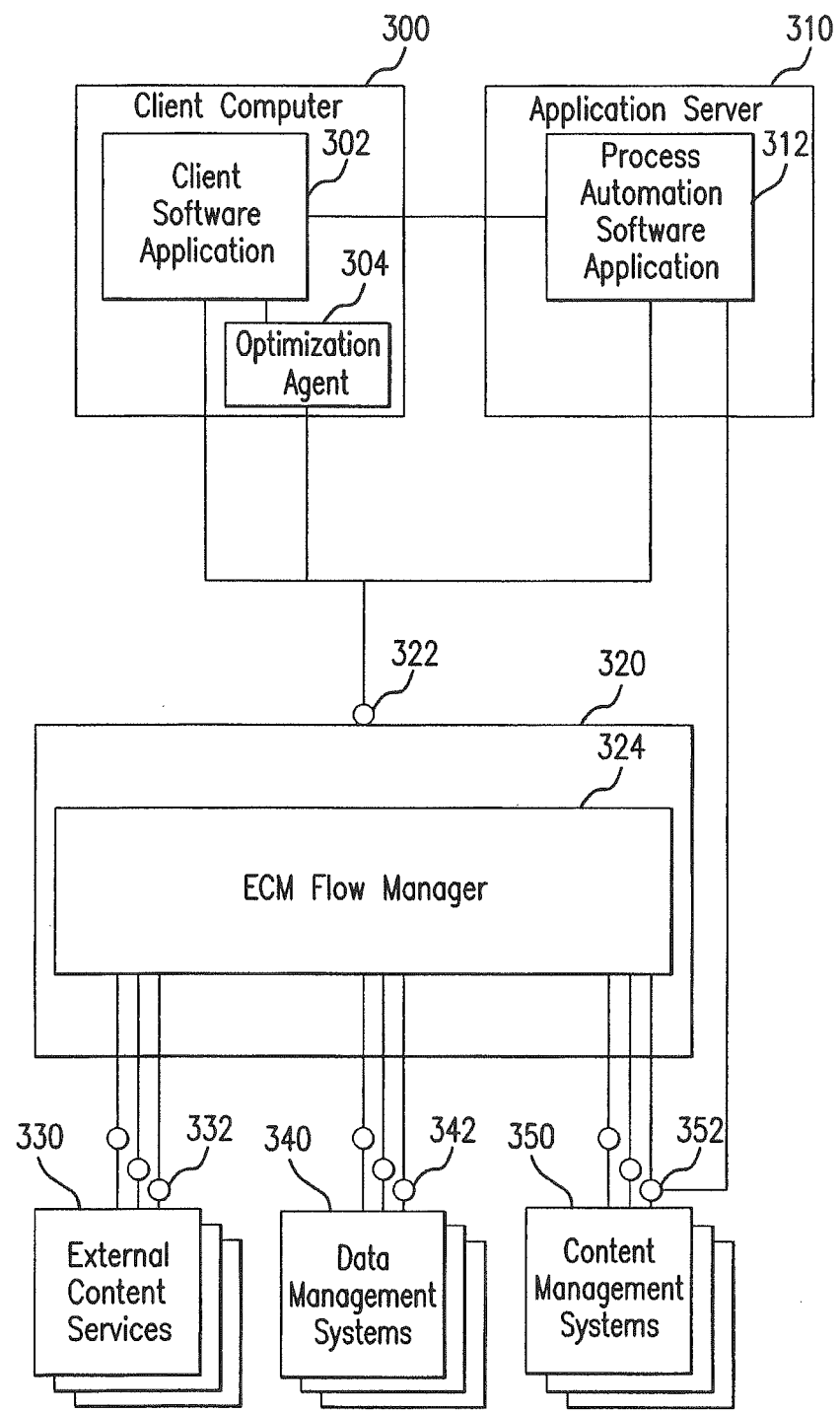
FIG. 3 schematically illustrates an exemplary system for supporting a departmental process in accordance with embodiments of the invention.

FIG. 3 schematically represents an exemplary system for managing content. As shown in FIG. 3, client application software 302 running in client 300 may be connected to server 320 through application program interface 322. Server 320 is programmed according to one or more of the methods disclosed herein in the so-called ECM Flow Manager 324.

The ECM Flow Manager 324 is connected to one or more data management systems 340 through their respective application program interfaces 342 and to one or more content management systems 350 through their respective application program interfaces 352. Data management systems 340 are generally systems that manage structured data, such as Enterprise Resource Planning (ERP) systems, or Customer Relationship Management (CRM) systems, or other systems of a similar nature. Content management systems 350 are generally systems that manage unstructured data or documents, such as document management systems, web content management systems, digital asset management systems, document imaging and archiving systems, or other systems of a similar nature. The services provided by the methods of disclosed herein make it unnecessary for client software application 302 to connect directly to systems 340 and 350 because the information needed by client application software 302 is delivered by the services disclosed herein.

As described above for the prior art, client 300 may, in some embodiments, rely on one or more process automation software applications 312 running in server 310 for enabling the user to perform a departmental process, in which case process automation software application 312 is connected to the ECM Flow Manager 324 running in server 300 through their respective application program interfaces 322, and thereby eliminating the need for client software application 302 to connect directly to the ECM Flow Manager 324. In some embodiments, client application software 302 or process automation software application 312 may also be connected to one or more departmental content management systems 352 in order to support the methods that are specific to those applications—typically methods that pertain to creating and modifying content.

Such methods may be distributed across more than one of server 300 for the convenience of the system administrators or in order to service the demands of a large number clients 300 and application servers 310.

Figure 4A:
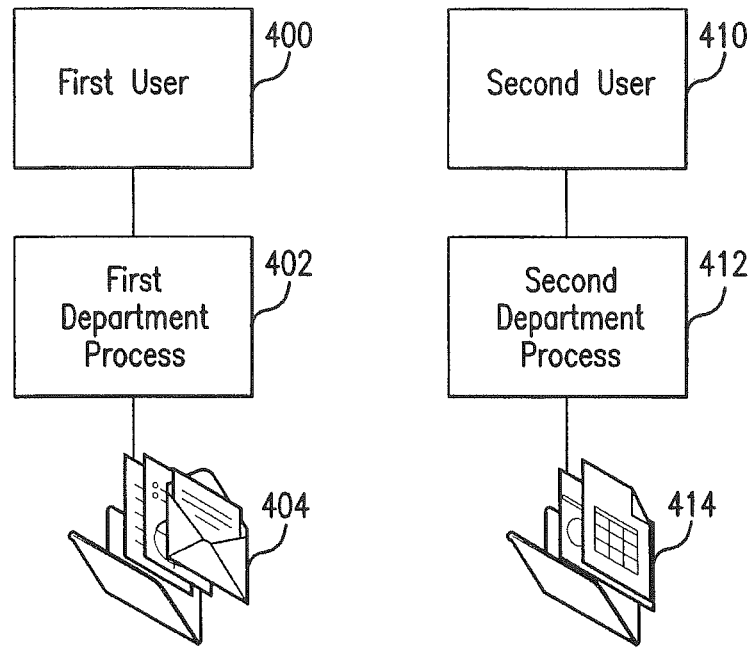
FIG. 4A and FIG. 4B schematically illustrate the problem presented by prior art systems for accessing content across two departmental processes.
Figure 4B:
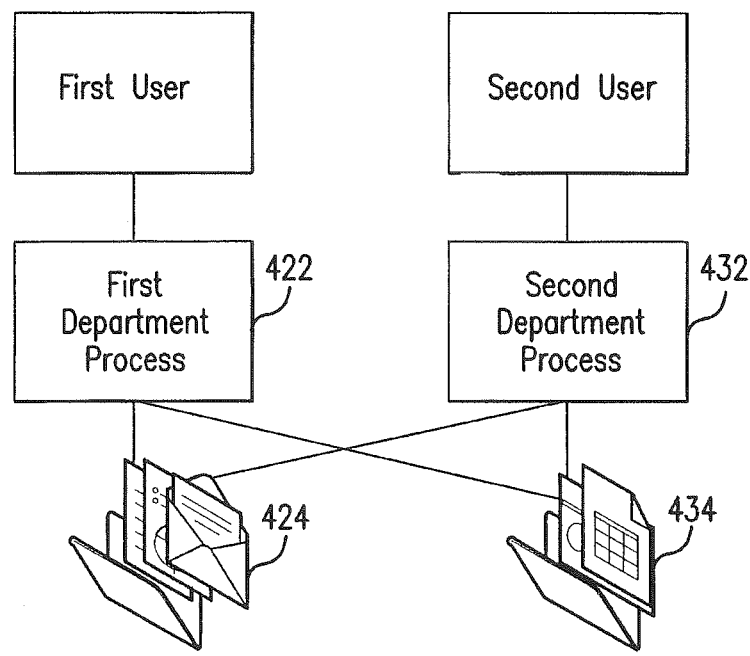

FIG. 4 schematically depicts a problem of prior art systems. As shown in FIG. 4, users 400 and 410 from different departments, using their respective departmental processes 402 and 412, have direct access to their respective departmental content 404 and 414. Typically, the first user 400 has direct access to the content 404 belonging to its own department process 402 but lacks easy access to content 414 belonging to a process 412 of a second department. Similarly, a second user 410 who is in a second department will lack easy access to content 404 belonging to the first department. FIG. 4B schematically depicts a prior art solution to this problem, whereby the departmental processes 422 and 432 are programmed with instructions that are specific to both of the systems that manage the content 424 and 434 or that content 424 and 434 are stored in a shared file system that may lack specific features and functions required by departmental processes 422 and 432 to maintain content 424 and 434. This problem grows proportionally when considering that a typical organization will have many departments, each with many department processes, and many different types of content that is accessed by individuals in departments other than the department that maintains the content.

Figure 5:
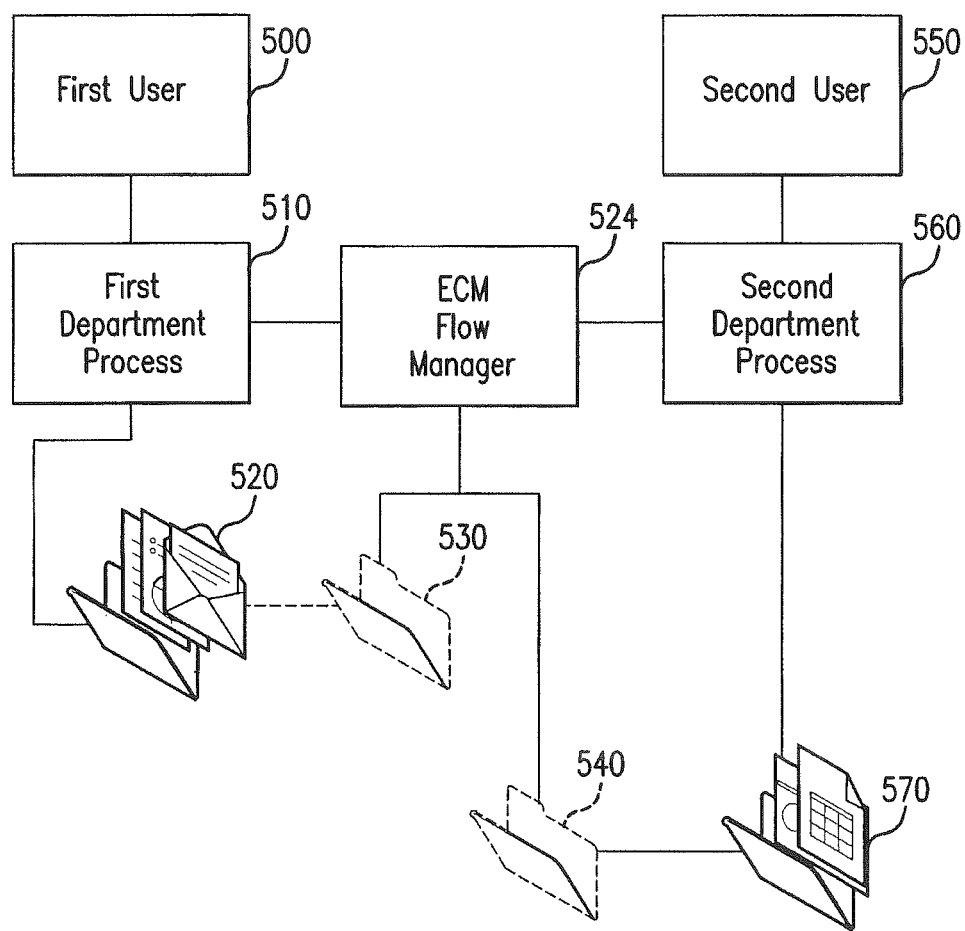
FIG. 5 schematically illustrates a solution presented in accordance with embodiments of the invention for accessing content across two departmental processes.

In reference to FIG. 5, a procedure is proposed for connecting the content across departments and their processes. FIG. 5 schematically depicts a simplified exemplary concept of the virtual folders provided by the methods of disclosed herein. As shown in FIG. 5, a first user 500, using the methods in a first department process 510 directly maintain the unstructured content 520 belonging to the first department. A second user 550, using the methods in a second department process 560, directly maintain the unstructured content 570 belonging to the second department. Using the methods disclosed herein, both users 500 and 550 have access to the unstructured content belonging to their own department as well as that belonging to the other user's department using the so-called ECM Flow Manager 524, which provides access to content 520 and 570 through views such as virtual folders 530 and 540 visualized through a common interface and independently of the underlying content management systems in which the departments maintain the original content and independently of any data management systems that are required to provide business context to the content.

Figure 6:
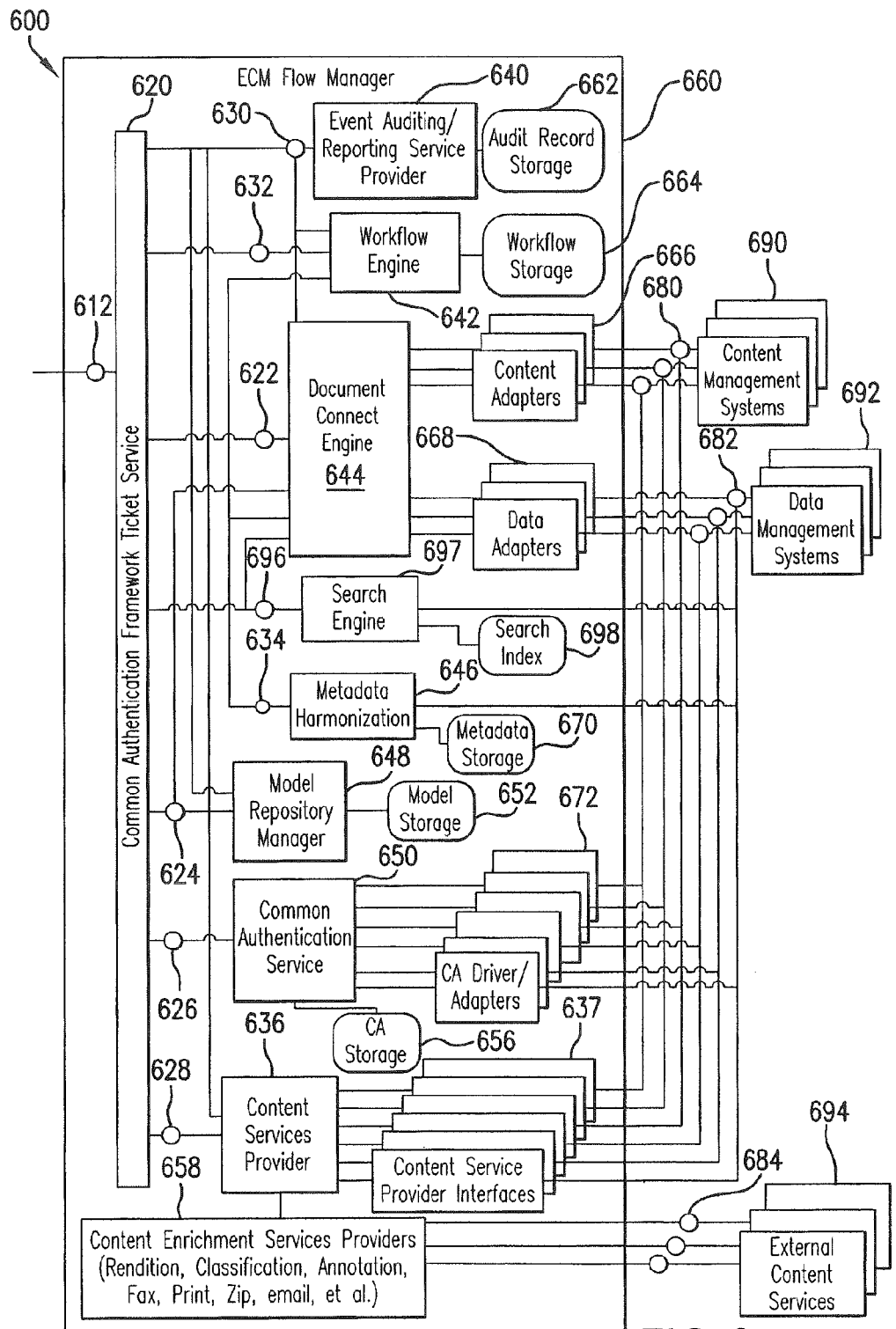
FIG. 6 is a block diagram of an embodiment of the run-time components in accordance with embodiments of the invention.

An illustrative example of the system for managing content is schematically depicted in FIG. 6. As seen in FIG. 6, the system 600 comprises a set of component services herein referred to as the "ECM Flow Manager" 660 which optionally connect to one or more external content management systems 690 through their respective application program interfaces 680 and to one or more external data management systems 692 through their respective application program interfaces 682 and to one or more external content services 694 through their respective application program interfaces 684.

The services within the ECM Flow Manager system 660 are exposed for consumption by other applications and systems through a set of application program interfaces 612, which may be implemented in a form that is useful to or dictated by the specific types of consumer applications. Therefore, interfaces 612 may be provided as web services, Java classes, C++ functions, dynamic link libraries, shared libraries, and so forth. In the preferred embodiment, interfaces 612 are web services, implemented using WDSL standards and published through a UDDI registry so that the services are easily discovered and consumed by the applications that use them.

Access to the ECM Flow Manager 660 is secured by a common authentication framework which is implemented through a common authentication service 650 that intermediates the external authentication required for access to the ECM Flow Manager 660 and access to external content management systems 690 and data management systems 692. The common authentication service 650 can be configured to recognize the credentials that are passed into the system 660 by one or more external authentication mechanisms, such as that provided by Microsoft Integrated Windows Authentication (formerly called NTLM, and also known as Windows NT Challenge/Response authentication), or by SAP's Single Sign-On. Optionally, the common authentication service 650 can be configured to perform authentication using a user account and password maintained in local store 656. On authentication, the common authentication service issues a ticket that is revalidated by the common authentication framework ticket service 620 on each subsequent access to any of the underlying services within the ECM Flow Manager 660 system.

In a typical scenario, a department process 510 or 560 has been adapted to use the ECM Flow Manager 660 model repository manager service 648 to discover the virtual folder model or models that have been registered in model storage 652 and that are appropriate to the department business scenario and role of user 500 or 550 within the departmental process. The models in model storage 652 are registered through repository manager 648 by virtual folder model design tools, which are described in another section of this specification. Having selected the appropriate dynamic folder model, department process 510 or 560 invokes services provided by the Document Connect Engine 644 via service interface 622 to visualize the model in the manner that is appropriate to the user interface technology for which the department process 510 or 560 has been developed. Thereby, users 500 and 550 have access through the Document Connect engine 644 to data and content configured by the virtual folder model, wherein the actual data and content are maintained in external content management systems 690 and in external data management systems 692. Document Connect engine 644 relies on content adapters 666 to access information in the external content management systems 690 using their respective application program interfaces 680 and on data adapters 668 to access information in the external data management systems 692 using their respective application program interfaces 682. Document Connect engine 644 relies on the common authentication service 650 to ensure that users 500 and 550 access only the data and content that they have permissions to access through their individual access grants or through access granted to a group or role in which they are authorized to participate.

The virtual folder models may include references to content within a structural context that is at a level above the structure of the content maintained in any of the external content management systems 690 in which the content is actually maintained. For example, a business content model may represent a business object, such as a contract binder, while the underlying content management system may represent individual contract documents. The model repository manager 648 also services requests to discover these content models that have been registered in model storage 652 by business content modeling tools, which are described in another section of this specification.

Business content models are also used to configure the set of content services that are available for content objects associated with a virtual folder model. Examples of content services are requests to fetch or download a copy of the content, to store new content, to store a new version of the content, or delete the content. The content services are configured through content services provider 636, which supports one or more content services according to the configuration of the system. Since all of the content related behavior that is presented to the user is associated with these content services, the content services provider 636 supports custom and generic services implemented in a content service provider interface 637 for each available data management system 692 and content management system 690. Generic content services support actions that are common across the various data management systems 692 and content management systems 690, while custom content services support actions that are unique to a data management system 692 or content management system 690. Each content service provider interface 637 defines the available content service actions for the associated data or content management system and provides the program logic required to execute the action in the appropriate client user interface framework—for example, as JavaScript for a web browser client, or as managed .NET or COM objects for a rich client—or as server-side program logic if it is not feasible to execute the action in the client. Each content service provider interface 637 accesses the data management system 692 or content management system 690 for which it has been designed to work through its respective application program interface 682 or 680.

Other content service requests require enrichment of the content object over and above what may be directly available from the content and data management systems 690 and 692 respectively, in which case the content services provider 636 brokers the content services request to a content enrichment services provider 658 according to the configuration of the system. Each of the available content services providers 658 in turn brokers the request to be fulfilled by specific external content services 694 through their respective application program interfaces 684. Examples of such enrichments services are requests to annotate a content object; to produce a zipfile containing one or more content objects; to print a content object; and to render the content object to another format—for example, to an archival format such as Adobe Acrobat PDF or to an image format such as TIFF.

Business content models are also used to configure a set of workflow services for the content that is associated in a virtual folder. FIG. 6 shows a workflow engine 642 that can be accessed through an application program interface 632 under the security model provided by common authentication framework ticket service 620. The workflow engine 642 facilitates the flow of content across the department processes within an organization. The flow is defined as a series of process steps configured in a workflow template or map that is created using a workflow design tool and stored in the workflow storage 664 of FIG. 6. A process step may be directed through configuration to notify an individual user who may optionally be required to perform an activity before sending the workflow to the next step in the workflow process template or map. A process step may be directed to automatically perform a content service, such as those implemented through the content services provider 636. A process step may be directed to another process, such as a business process of another department that is implemented in a software application 510 or 560, by notifying the process that the associated event has occurred or by triggering the activation of the other process.

In another embodiment, the initial process step of a workflow template or map can be activated by an event that is configured in a business content model or directly, via application program interface 632. Optionally, the initial process step may be configured to accept content and/or metadata additional to the content, such as metadata required to activate the new business process that is being initiated as modeled in the workflow template or map.

Optionally, a process step may be configured to notify users 500 and 550 or other users who are external to the process that an event has occurred. Such notification may occur based on a content event for which the user has requested notification, as in a subscription to an event associated with a business content model—for example, when the associated content has been created, modified, or deleted. Optionally, the notification may be sent to a user without subscription, based on a configuration that pushes notification to certain users individually, or according to the group or role in which the user may belong.

The workflow engine 642 of FIG. 6 provides a highly configurable process management sub-system, providing event subscription, event notification, and routing rules. Thereby, the ECM Flow Manager 660 can connect otherwise disconnected processes, based on business content models and workflow templates and maps.

Optionally, based on configuration by the administrators of the system, the events that flow through the ECM Flow Manager 660 are recorded by the event auditing service provider 640 and stored in the audit record storage 662. For each event, the record includes all or substantially all of the information necessary, configured, or desired to identify the event, the user 500 or 550 who caused the event, the date and time of the event, the business content associated with the event, the process 510 or 560 associated with the event, and the information changed by the event—such as the before and after values of data and documents. Such audit records are available for reporting through the event reporting service provider 640 via application program interface 630 and under the security model provided by common authentication framework ticket service 620 which ensures that users 500 and 550 requesting reports do not inappropriately access audit information about data or content for which they lack access rights.

Optionally, the operations performed by individual users 500 and 550 may be monitored using an optimization agent 304 installed on client 300. The optimization agent 304 records the operations performed by user 500 and 550 using event auditing service provider 640 through its respective application program interface 630 and, thereby, creating records in audit record storage 662. Subsequently, the monitoring records may be analyzed to detect process inefficiencies either in the operation of certain individuals or by all individuals having the same role in a process. The operations management can act on this information to provide additional training to the individuals who are using the system inefficiently, or redesign the associated processes.

Search Engine

As discussed above and as schematically depicted in FIG. 7 and FIG. 8, the Document Connect Engine accesses business content through configuration in a business content model 700 and 820 in the context of a virtual folder node 810 within a virtual folder model 800. The business content model 820 may specify access to content through a specific technical interface 822 that is provided by the external data or content management system that has been optimized to return a list or net of content objects based on input parameters provided when invoking the technical interface 822. Alternatively, some data or content management systems will provide a generalized search query interface that can be used to return a list of content objects based on query expressions, which may include structured metadata fields or full-text content term or a combination of structured fields and full-text terms using Boolean operators.

Optionally, an embodiment may include a search engine 697 accessed through service provider interface 696. Search engine 697 may be configured to extract data and content from one or more external data management system 692 using their respective service provider interfaces 682 and from one or more external content management systems 690 using their respective service provider interfaces 680. Data and content extracted from said systems can be indexed in search index 698 in order to optimize the query expressions passed into search engine 697 through service provider interface 696. Optionally, if a data management system 692 or a content management system 690 provides a native search service, search engine 697 may federate the query expression by passing all or part of the query expression to said native search services through their respective service provider interfaces 680 or 682. Said query federation may take place in addition to or as another mechanism for using the search index 698.

An advantage of using search engine 697 is that search engine 697 may support query expressions that rely on features that are not provided by native service provider interfaces 680 or 682 of data and content management systems 692 and 690. An example of a feature that may be employed is the summarization of extracted data or content and the identification of key terms or concepts within said summarization. Search engine 697 may store said key terms or concepts in search index 698 for the benefit of building concept-based views or facets that are associated with the content objects in the result list returned from executing a query expression. The concept-based views or facets may then be presented to user 500 or 550 as an expansion of virtual folder node 810 to further enhance the usability of the search results in the context of the business scenario and role within the departmental process modeled in virtual folder model 800.

Search engine 697 returns search results through service provider interface 696 under the security model provided by common authentication framework ticket service 620, wherein the search results may be a simple results list or a results list that is enhanced by the additional features such as concept-based views or facets that are available in search engine 697. Optionally, the results list may be constrained using the credentials provided by common authentication framework ticket service 620 according to the access permissions of the user performing the search. For search queries on content indexed in search index 698, the permissions model of the original data management system 692 or content management system 690 is incorporated into the query processing method of search engine 697. For search queries federated to native search service, the authentication framework ticket service 620 optionally brokers access using the user credential for the native search service.

Business Content and Virtual Folder Models

An embodiment proposes business content models and virtual folder models registered in model repository manager 648. These models are maintained in a model repository 652 in a structure and format that enables the systems and methods disclosed herein to efficiently use them. Methods are provided for external consumer systems to discover the model that is appropriate to the business process and to the role of the individual user; for delivering one or more representations of a model to the consumer in one or more formats that are recognized by the consumer; for ingesting models in one or more formats from external applications that are used to design and maintain such models; and for exporting models in one or more formats. The ECM Flow Manager system will also include design-time procedures and service provider interfaces that enable business analysts and system administrators to configure and maintain business content models as appropriate for the various types of content that are exposed to consumer applications.

Figure 7:
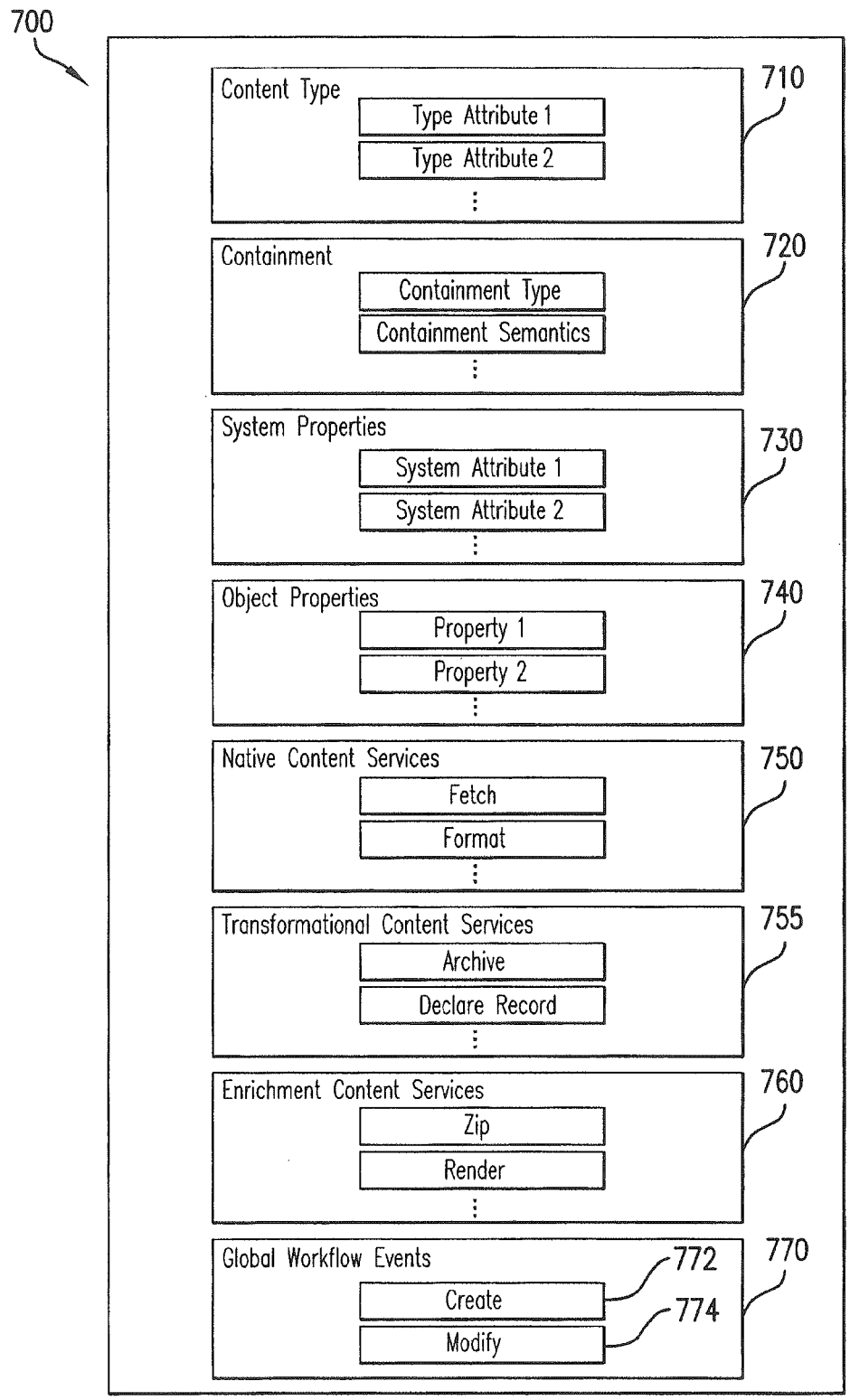
FIG. 7 is a block diagram of an embodiment of a business content model.

FIG. 7 schematically depicts an exemplary business content model 700. Business content model 700 models a business content object, which is the basic building block of the ECM Flow Manager system. Business content objects are a set of entities that are generally accepted in the business world. Examples include: "contract", "invoice", "case binder", or other semi-structured data adapted or directed to a business processes. The business content model 700 for a business content object defines the common characteristics, or attributes, of the content items in the object class. The business content model 700 also defines the common behavior of, or content services and actions that can be performed on, the content items in the object class.

Each business content model 700 includes attributes defining the common characteristics of the object class. Exemplary characteristics include content type attributes 710, containment properties 720, system properties 730, object properties 740, native content services 750, transformational content services 755, and enrichment content services 760.

Content type attributes 710 refer to characteristics configured to identify and process instances of the content objects modeled by the business content model 700. Examples of content type attributes include, but are not limited to, the display name of the content object type (e.g., "Folder", "Document", "Case"), description of the content object type, and audit level of the content object. Optionally, a content type attribute may be available in multiple languages.

Containment properties 720 refer to content object types that can contain content type objects as, for example, a "folder" or a "compound document". Containment properties may include, but not be limited to, rules for what content object types may be contained and if the objects are ordered.

System properties 730 refer to properties derived from the system from which the content object is obtained and will, therefore, vary according to the native system and the content type. Examples of system properties include display name, creation date, modification date, unique identifier, and format. Optionally, a system property may be available in multiple languages.

Object properties 740 refer to attributes of the objects that may vary with individual object instances as well as with the object type. Object properties may be simple attributes, such as a classification value. In some content management systems, object properties may be arbitrarily complex, multi-level, multi-value, language varying attributes grouped into multi-level, multi-value sets. In some embodiments, a mechanism may be provided to map, display, and even update one or more object properties. In other embodiments, the system will defer activity related to displaying and maintaining object attributes to interfaces of the original data or content management systems.

Content services 750, 755, and 760 refer to the actions available for the objects in the class defined by the content object model and, together, define the ways in which individuals and processes may interact with the objects. These actions will be exposed to the users or processes that consume the object model in a user interface or as operations that may be performed on the objects in the class. Optionally, content services may be mapped according to user permissions or roles, so that the system may expose different actions to different users.

Native content services 750 refer to those actions that are generally performed within the context of the data management system or content management system in which the object resides. Some native content services may be generic, such that it is common to all objects—such as "open" or "get properties". Other content services may be custom to the object and/or originating system.

Transformational content services 755 refer to actions that are performed on a content object such that the object is transformed from the state or condition that it existed in the underlying data or content management system in which it resided prior to the action. An example of a transformational action is "archive" whereby the native content object is moved to another content management system and replaced in the native system with a "stub" that directs future references to the archived object. Another example of a transformational action is "declare a record" whereby the native content object may be moved or otherwise protected from modification and deletion according to the native content system so that it can be managed under a file plan and retention policy implemented by a records management system.

Enrichment content services 760 refer to actions that are performed on a content object that leave the native object intact, but that enrich the content through an operation performed in an independent system. An example of an enrichment content service is "rendition", which may render the native content object into another format such as TIFF, or Adobe® Acrobat PDF and store the rendition in the native system or in another repository. Another example of an enrichment content service is "annotate", which may store a note in association with the content object in the native system or in another repository. In the preferred embodiment, the ECM Flow Manager will be configured with one or more external content services 694, which may include one or more data and document management systems, for the implementation of the set of available enrichment content services. The enrichment content services will be brokered by a content enrichment services provider 658 that will access the external content services 694 through their respective service provider interfaces 684.

Figure 8:
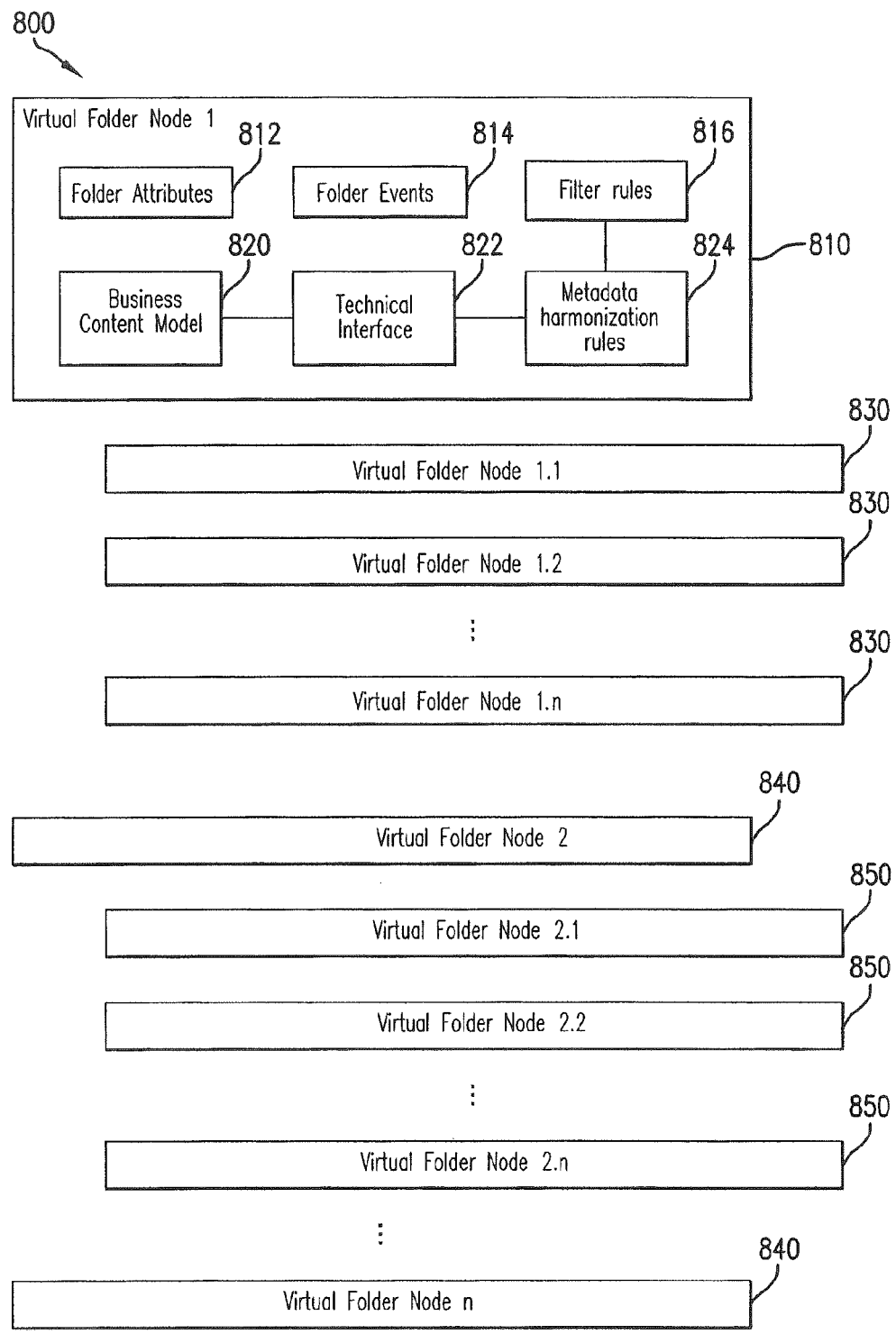
FIG. 8 is a block diagram of an embodiment of a virtual folder model.

A business content model is referenced in one or more virtual folder models, which is schematically depicted in FIG. 8. As shown in FIG. 8, a virtual folder model 800 models a hierarchy of virtual folder nodes 810, 830, 840, and 850. FIG. 8 depicts an exemplary virtual folder node 810. Folder attributes 812 identify and describe virtual folder node 810—for example, by providing a folder name and description with provision for localizing those strings in several languages. Virtual folder node 810 includes a business content model reference 820 which models the content objects that are virtually organized within the virtual folder node 810. The business content model 820 is mapped to a technical interface 822 that specifies how to obtain the content objects from the underlying data or content management system. The technical interface 822 will identify the specific underlying data or content management system, the programmatic interface methods, and the input parameters required to connect to the underlying system with appropriate access credentials. In the preferred embodiment, the definition of system connection information will be maintained a structure designed for that purpose, since any given system may be referenced within many virtual folder nodes.

The technical interface 822 will also identify the programmatic interface that is used to retrieve instances of the business content objects from the designated system. The type of the programmatic interface will depend on the specific requirements of the underlying system. For example, the programmatic interface may specify a remote function call (RFC), or a web service, or an HTTP request. Therefore, the preferred embodiment will provide for each defined system type the availability of programmatic methods. Referring to FIG. 6, this relationship will be determined by the set of data adapters 668 and content adapters 666 that are configured for Document Connect engine 664, since the Document Connect engine 664 will be interpreting the technical interface 822 parameters when the virtual folder model 800 is instantiated for a consumer application.

The specification of technical interface 822 will determine the set of metadata available for the business content model reference 820. The metadata for this technical interface 822 may be mapped to the business content model 820 through metadata harmonization rules 824 so that the business content objects that are retrieved through technical interface 822 are appropriate to the context of the virtual folder node 810. For example, the business content model 820 may reference an attribute for "customer" and the technical interface 822 may specific a parameter for "customer", however the business content model 820 may expect a "customer" to be an alphanumeric string while the technical interface 822 may expect a "customer" to be a numeric identifier specific to the underlying data or content management system. Referring to FIG. 6, these metadata harmonization rules 824 will be interpreted by the metadata harmonization engine 646 through the associated application program interface 634. Metadata harmonization engine 646 relies on connections to each of the underlying data management system 692 and content management system 690 and persistent storage of metadata mapping relationships in metadata storage 670.

Optionally, the business content model 820 may define a query expression to be executed on a search engine 697 accessed through service provider interface 696. The content objects returned by executing the query may have a diverse set of metadata elements that may be structured properties, such as classifications and attribute properties associated with the individual content objects in the result set; or that may be structured properties within the content of the object, such as form fields; or that may be unstructured properties, such as key concepts or terms derived from or text-mined from document contents. In an embodiment, the virtual folder node 810 may specify a dynamic view that is constructed on-the-fly and based on an analysis of the clusters or facets of said structured classifications and attributes and unstructured key concepts within the set of content objects returned by the search engine.

Figures 10A, 10B:
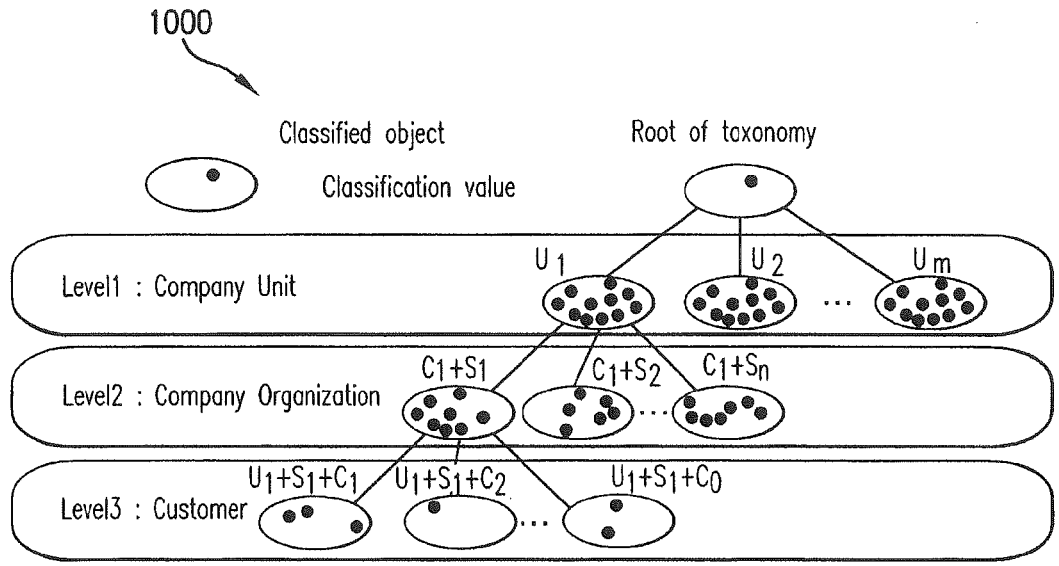
FIG. 10A-D schematically illustrate an exemplary taxonomy that may be represented using virtual folders.

FIG. 10A shows an illustrative example of a taxonomy 1000 that might be used by an enterprise to organize sales documents. In this example, sales documents are to be organized according to a hierarchical classification with values for company, sales organization, and customer. FIG. 10B shows an illustrative example of a physical folder structure 1010 that has been organized to allow the user to navigate to the documents according to taxonomy 1000 of company, sales organization, and customer. However, the user may want to consider other characteristics such as sales representative and product when looking for sales documents. Those of ordinary skill in the art will understand that the disclosed systems and methods are not limited to the example and can implement a taxonomy based on features different than and/or additional to those described in the example.

Figure 10C:
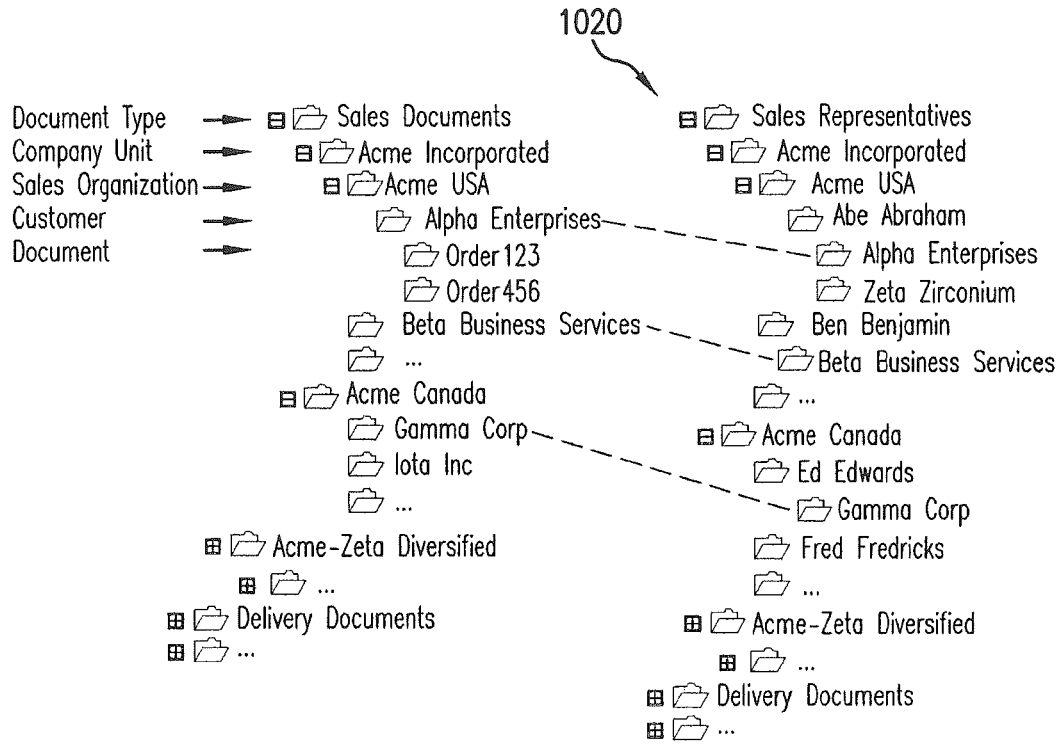
Figure 10D:
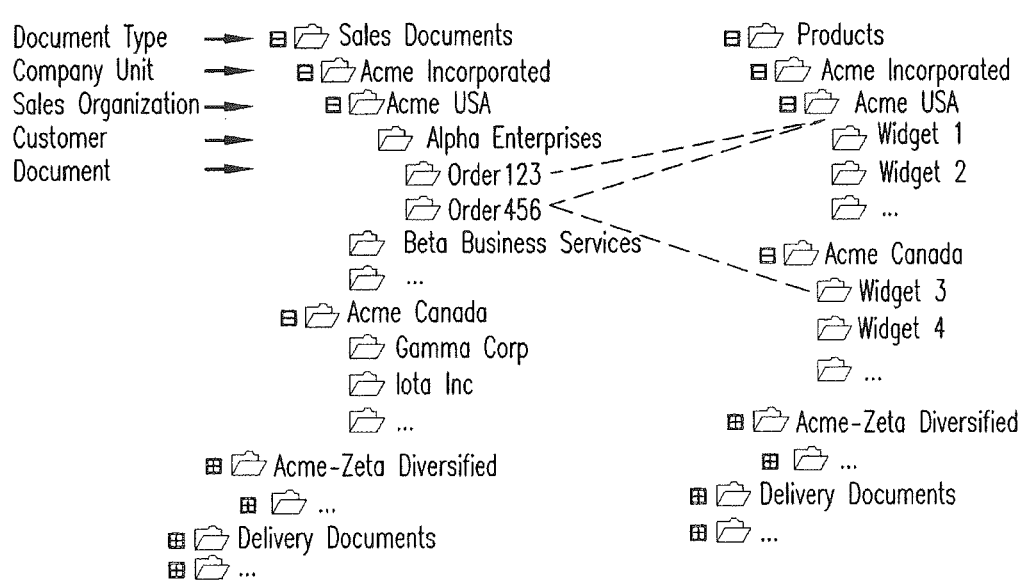

FIG. 10C and FIG. 10D show virtual folder views 1020 and 1030 that could be provided to allow the user to visualize and navigate to sales documents by characteristics of sales representative and product respectively.

Figure 11A:
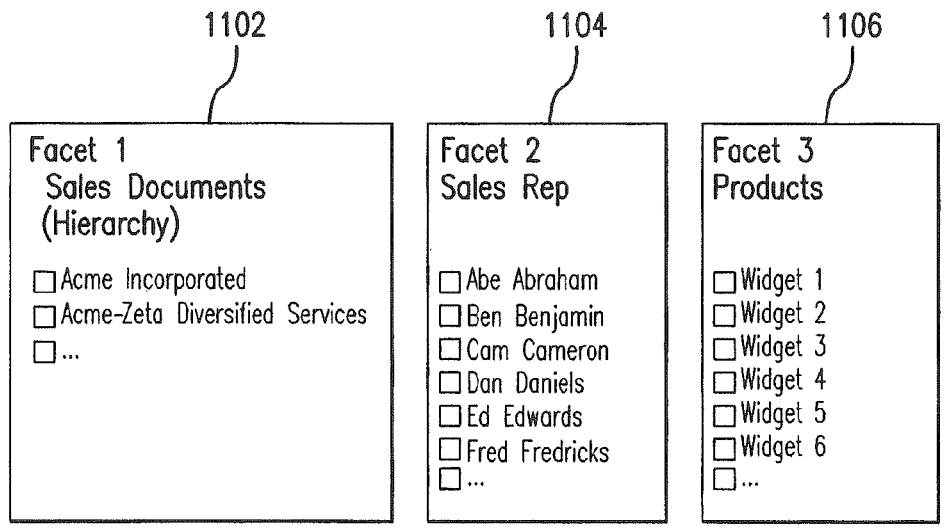
FIG. 11A-B schematically illustrate an exemplary application of facet classification trees.

If desired, a set of facets could be configured to provide multi-dimensional navigation, wherein each facet characterizes a value space along independent axes or dimensions. FIG. 11A shows an illustrative example of three facets that are provided to enable a user to find the sales documents according to taxonomy 1000 and the additional characteristics of sales representative and product. Facet 1102 displays a list of available company units with provision for the user to select one or more company units, facet 1104 displays a list of available Sales Representatives, and facet, 1106 displays a list of available products. Each of the items listed in a facet may be selected to instruct the system to include the sales documents that are classified according to the characteristic selected, or, in the case of facet 1102, the sales documents that are classified under the selected level of the taxonomy represented by facet 1102.

Figure 11B:
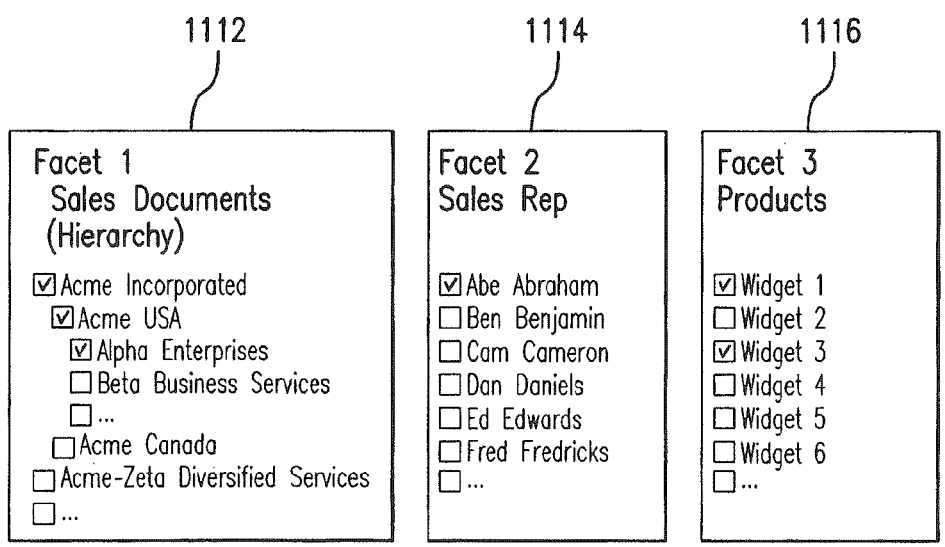

In an embodiment, when an element in a hierarchical taxonomy is selected, the system automatically expands the element to display and allow the user to select subsidiary elements. FIG. 11B shows an illustrative example in facet 1112. When the user selects a company, the system expands the display in facet 1112 to show the sales organizations within the company.

When the user selects a sales organization, the system expands the display in facet 1112 to display the customers within the sales organization.

In an embodiment, the system may automatically de-select in a second facet, those characteristics that are not associated with any of the content objects that have already been selected by the choices made in a first facet. In the example shown in FIG. 11B, the selection of customer Alpha Enterprises, in facet 1112, and sales representative Abe Abraham, in facet 1114, would de-select those widgets in facet 1116 that do not appear on any sales document for which Abe Abraham was the sales representative. Optionally, the de-selected items may be removed from the display.

Optionally, the system may display the number of content objects that are currently selected according to the criteria entered by the user in the available facets. The system may display the total number of content objects and, optionally, the number of content objects associated with each element displayed in a facet. Some embodiments may simply display the list of content objects (all objects or the first "n" objects) while other embodiments may display a button which enables the user to request a list of the content objects. In some embodiments, the facets may be presented to the user in the primary display region with the content objects. In other embodiments, the facets may be presented to the user in a secondary display region while the content objects are displayed in the primary display region.

Therefore, facets allow a user to navigate to content objects using any or all of the available facets in an interactive manner.

The configuration of virtual folder node 810 may also specify filter rules 816 that are applied to the selection of business content objects retrieved through technical interface 822. Filter rules 816 may be statically defined, so that they may be applied consistently to filter the retrieved content objects based on key fields mapped to content attributes 710, 730, or 740. If desired, filter rules 816 may be passed downward through any hierarchy and applied on each instance of the activation of the virtual folder model 800, so that the retrieved content objects are constrained to the context defined by the parent nodes in the hierarchy. In the case of virtual folder nodes 830 and 850, which are children of parent virtual folder nodes 810 and 840, filter rules 810 may specify that the filter of the parent node is propagated to the child node to constrain the retrieved content objects in the virtual subfolders to the same context of the virtual parent folder. If desired, filter rules 816 may specify that the user input is requested when the folder node 810 is selected, and the user-provided values be used to constrain the selection of the content objects retrieved through technical interface 822. As the user navigates deeper and deeper, the selection becomes more and more restrictive until a leaf node is reached. A leaf node defines a business content object, which is a unique record in a data management or content management system.

Figure 12:
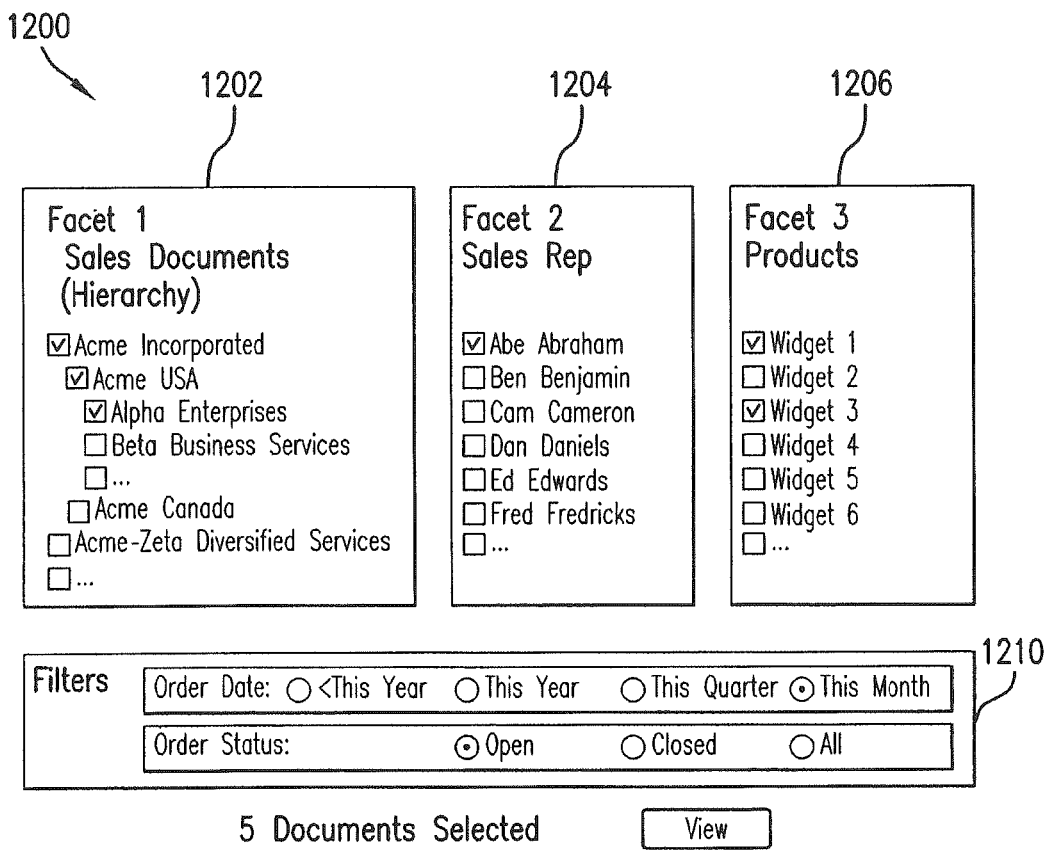
FIG. 12 schematically illustrates an exemplary application of filters used together with facet classification trees.

Optionally, the filter rules 810 may also be applied to facet based navigation to constrain the selection of content objects in a similar manner FIG. 12 is an illustrative example showing how filters 1210 may be used to restrict the retrieval of content objects associated with the selections made in facets 1202, 1204, and 1206.

Regardless of the path used to navigate to the content object, the user can interact with the system disclosed herein through a user interface constructed from the virtual folder model and the instantiated content objects that result from the query and applied filtering. The business content model 700 provide for the definition of a set of content services 750, 755 and 760 associated with the content as defined by the content model 820 of the virtual folder node 810. The content services may be presented to the user in one or more user interface paradigms—including toolbar buttons, context menu options, and hyperlinks. Since almost all of the behavior presented to the user is associated with these content services or actions, there is no limit on what an action may do. Generally, there are at least three different classes of content services—Native content services 750, Transformational content services 755, and Enrichment content services 760.

Native content services 750, are services that are supported by the underlying data or content management system in which the object resides.

Transformational content services 755 operate on the content outside of the underlying data or content management system in which the content resides. The result of a Transformational content service 755 may be to return the modified content to the residing system, or it may be to replaced the content of the underlying system with the modified content residing in a different system that has been configured for that purpose—for example, when the native system does not allow modifications. An example of a transformational content service 755 is archiving, where a content object may be moved from the native system to an archival content management system and the content object in the native system replaced with a proxy or stub or otherwise marked in such a manner that the user can see that the content has been archived. Optionally, a content service or action on the archived content object will enable the user to retrieve the content from the archival content management system. Another example of a transformational content service 755 is declare record and/or mark official whereby one or more classifications are applied to the native content object and maintained in a records management application. Access to the native content object is thereafter under the control of the records management application which may reduce the permissions of users to the native content object so that disposition of the content object may be under the control of the records management application rather than any casual business user.

Finally, enrichment content services 760 operate on content outside of the underlying data or content management system to produce an additional content object that may be maintained in the native system or, if that is not practical, in an external content management system. An example of an enrichment content service 760 is "rendition", whereby a content object is produced in an alternative format, such as Adobe Acrobat PDF/A or TIFF image format. Optionally, the content services for the content object are enhanced to include a content service or action that enables the user to retrieve the rendition format rather than the native format.

Optionally, the content services may be role-based, such that different users may be granted access to different content services or actions based on the role in which they are registered to the system.

In some embodiments, folder events 814 may be defined for virtual folder node 810. Folder events 814 may, for example, allow consumer processes to register to be notified when events occur with respect to instances of virtual folder node 810 and the associated content items.

Examples of folder events 814 are events such as "open", "create", "modify", and "add item". In some embodiments, folder events 814 may also provide for the local expression of global workflow events 770 with respect to the content item instances of business content object reference 820. For example, business content model reference 820 references business content model 700 which models a set of global workflow events 770 that defines events for "create" 772 and "modify" 774. The folder events 814 may restrict the registration of the "create" 772 event so that it is not available for subscription by consumer applications that use the virtual folder model 800 in which business content model 700 is used. If desired, the folder events 814 may specify that when the "create" 772 event occurs for item instances of content model 700, a "create" 772 workflow process is initiated in associated workflow engine 642 and/or the "create" 774 event is reported to event auditing/reporting service provider 640 for recording in audit record storage 662. When the workflow process registered in workflow engine 642 and associated with "create" 772 event is initiated; the workflow process receives information identifying the item instance of business content model 700; the virtual folder instance of virtual folder node 810; the consumer application process, user, and user role associated with virtual folder model 800; and additional metadata attributes associated with the creation of items in an instance of virtual folder node 810. Similarly, the audit event reported to event auditing/reporting service provider 640 may identify the "create" 772 event; the item instance of business content model 700; the virtual folder instance of virtual folder node 810; the consumer application process, user, and user role associated with virtual folder model 800; and additional metadata attributes associated with the creation of items in an instance of virtual folder node 810.

In another embodiment, a workflow process may be triggered or initiated by events that are not associated with a virtual folder model or a business content model. Such workflow processes are initiated by connecting directly to workflow engine 642 through the associated application program interface 632 and identifying the workflow process to be initiated; the consumer application process, user, and user role associated with event; and additional metadata attributes associated with the workflow process.

Initiation of a workflow process can indicate that a process definition be instantiated in workflow engine 642 which controls the enactment of the steps in the process definition. A process step may be defined to execute entirely within the confines of the workflow engine 642 or the process step may be defined to interact with users and applications external to the workflow engine 642. In order to support the flow of content through an organization and its departmental business processes, the ECM Flow Manager provides a plurality of interaction methods. Examples of message-based notification of external users through a variety of means, including email, SMS text message, voicemail, and pager. Another embodiment provides subscription based notification, whereby an external application can register to receive notifications for a class of workflow events through a standardized application program interface—for example, based on Really Simple Syndication (RSS) feeds. In another embodiment, notification is implemented through a universal work list, which is a form of "in-box" in which any system or application can register an event or alert, so that the user, group, role, or application process that owns the "in-box" has a central queue or list from which to receive events and instructions for a step that is to be performed.

In another embodiment, a workflow step that generates an event may trigger a workflow step in another workflow process, either defined in the workflow engine 642 or in a process defined to be executed in an external workflow engine. In this manner, workflow definitions can be chained together, effectively becoming sub-workflow processes of an overarching process definition. The interchange of workflow process definition may be implemented using a standardized workflow definition language, such as the XML process definition language published by the workflow management coalition.

In another embodiment, a process orchestration definition language may be used to define the types of interactions that are discussed above. An example of such a standard is Business Process Execution Language (BPEL), which is based on XML and web services.

As defined in the preceding paragraphs, the systems, methods, and apparatuses disclosed herein relies on models to drive the flow of content across departmental business processes. These models can be represented using any model specification language, such as XML, in order to interchange a model definition between components. In some embodiments, it may be sufficient to reference a model in an unambiguous manner rather than copy the entire model specification between applications.

In the preferred embodiment, a model repository manager 648 provides a service interface 624 for publishing services that enable applications to discover the models that are registered in the model storage 652 for the system. The model repository manager 648 also provides service interfaces 624 for registering and unregistering models in model storage 652. Model repository manager 648 service interfaces 624 are discovered by consumer applications through a service discovery protocol, which may be based on standards for similar repository services, such as UDDI, Universal Plug-and-Play (UPnP), Jini, or Service Location Protocol (SLP).

In an embodiment, applications that consume the services and models may be composite applications that are assembled by loosely coupling user-interface parts that cooperate through events and business context within an application framework. The composition may take place on the client, on a web server, or through a portal. Examples include Microsoft .NET, Microsoft Office SharePoint web parts, Microsoft Information Bridge Framework (IBF), Microsoft Visual Basic for Office Business Applications (VB/OBA), Microsoft Line of Business Interoperability (LOBi) for Microsoft Office SharePoint Server (MOSS), SAP NetWeaver Portal iViews, SAP WebDynpro, SAP NetWeaver Composite Application Framework, Oracle Portal, and Web 2.0 mash-ups using asynchronous Javascript and XML (AJAX).

Application Development Framework

Figure 9:
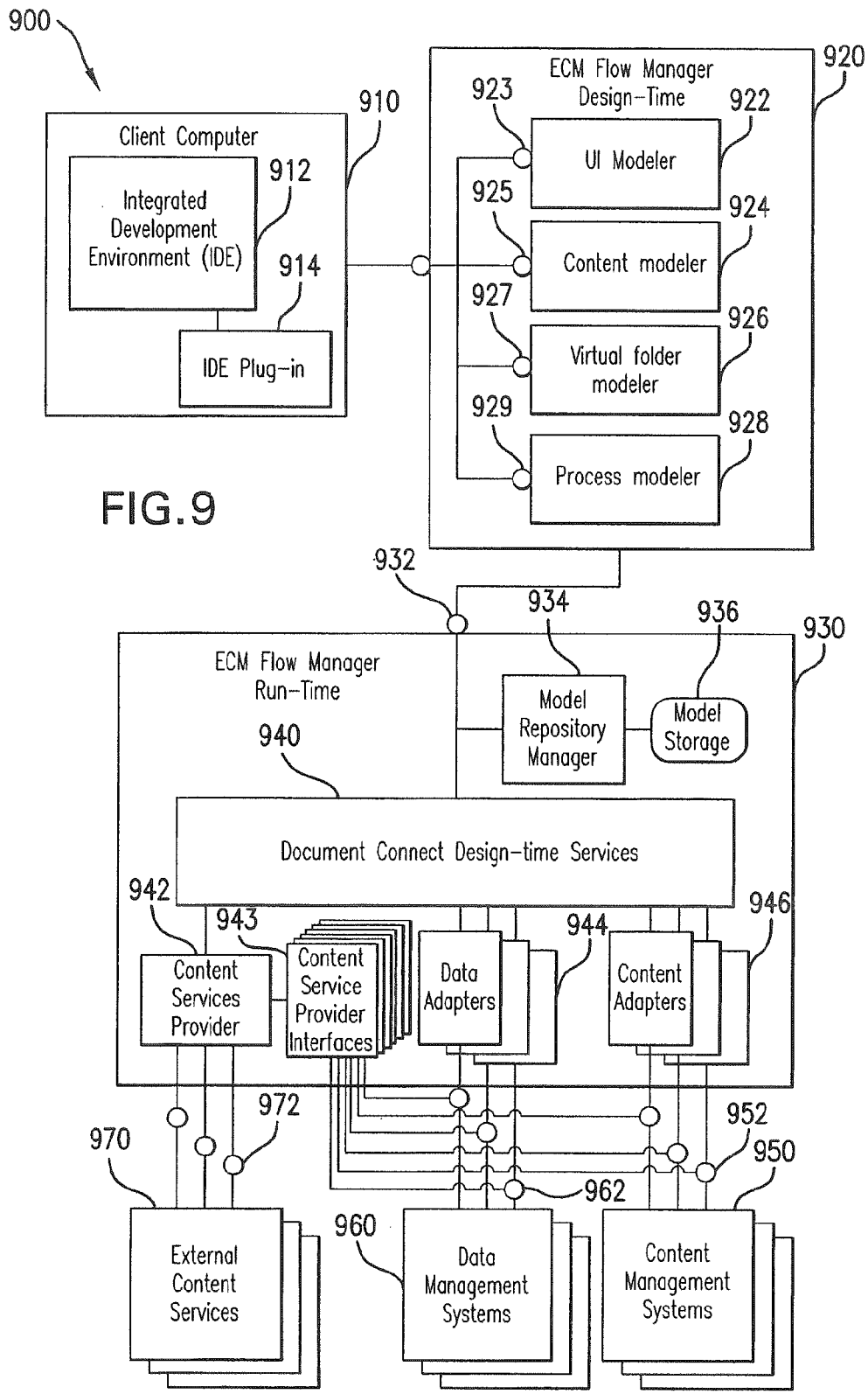
FIG. 9 is a block diagram of an embodiment of an application development framework with design-time and run-time components.

FIG. 9 schematically depicts an exemplary application development framework 900 that supports software application development on clients 910 through a plurality of integrated development environments (IDE) 912. In some embodiments, IDE 912 may integrate directly with a design-time environment 920 that provides services to support model-driven development. In other embodiments, IDE 912 may require an IDE plug-in 914 to integrate with the services provided by design-time environment 920.

As shown in FIG. 9, the exemplary design-time environment 920 provides one or more modeler services. In an embodiment, design-time environment 920 provides process modeler 928.

Process-modeler 928 communicates with IDE 912 through service provider interface 929 to support the development and integration of process models implemented as described herein. The development of a process model using modeler 928 may include workflow process template design tools such as a graphical workflow designer. A workflow process template designed using modeler 928 may be stored in model storage 936 through model repository manager 934 so that it may be effectively shared during design; and subsequently discovered, consumed, and initiated during run-time execution of applications; and referenced during the event processing of instances of the workflow template.

In another embodiment, a content modeler 924 is provided by design-time environment 920. Content modeler 924 communicates with IDE 912 through service provider interface 925 to support the development and integration of content models 700. Content modeler 924 uses design-time services provided by Document Connect 940 which, in turn, uses data adapters 944 and content adapters 946 to access respective data management systems 960 and content management systems 950 through their respective service provider interfaces 962 and 952. A content model 700 designed using content modeler 924 may be stored in model storage 936 through model repository manager 934 so that it may be effectively shared during design; and subsequently discovered and consumed during run-time execution of applications; and referenced during the event processing of instances of content model 700.

Content modeler 924 also supports the modeling of content services 750, 755, and 760. Content modeler 924 uses design-time services provided by Document Connect 940 which, in turn, uses content service provider interfaces 943 to discover and extend the native content services available for any given data management system 960 or content management system 950 through their respective service provider interfaces 962 and 952. In order to support transformational content services 755 and enrichment content services 760, content modeler also allows custom code to be invoked during action execution. Simultaneously, however, we may want to minimize the amount of custom code that is written to support at least some data or content management system, and the requirements imposed on any such code by the user interface framework.

To manage this, content modeler 924 provides:
A simple custom action Service Provider Interface (SPI) that allows custom action code to be executed on the client;
A parameterization mechanism that allows custom action code to be reused in many different contexts; and
A variety of generic content service types that can be used for many actions without custom coding. These are sufficient for many, but not all purposes. Implementations of new data and content management systems or solutions can be prototyped using generic content services, which may then be replaced with custom coded content services individually or in groups.

On the client side, content services are handled by application component objects that implement the action handler interface.

In another embodiment, a virtual folder modeler 926 is provided by design-time environment 920. Virtual folder modeler 926 communicates with IDE 912 through service provider interface 927 to support the development and integration of virtual folder models 800. Virtual folder modeler 926 uses design-time services provided by Document Connect 940 which, in turn, uses data adapters 944 and content adapters 946 to access respective data management systems 960 and content management systems 950 through their respective service provider interfaces 962 and 952. A virtual folder model 800 designed using virtual folder modeler 926 may be stored in model storage 936 through model repository manager 934 so that it may be effectively shared during design; and subsequently discovered and consumed during run-time execution of applications; and referenced during the event processing of instances of virtual folder model 800.

In another embodiment, a UI modeler 922 is provided by design-time environment 920. UI modeler 922 communicates with IDE 912 through service provider interface 923 to support the development and integration of User Interface models. UI models are used to render virtual folder models 800 for display within applications. The rendering of virtual folder models 800 is by necessity specific to the application development framework in which the model is to be displayed. A UI model designed using UI modeler 922 may be stored in model storage 936 through model repository manager 934 so that it may be effectively shared during design; and subsequently discovered, consumed, and used for rendering of virtual folder model 800 during run-time execution of applications. Thereby, applications developed using the same application development framework may share the same UI model for a given virtual folder model 800. UI modeler 922 also enables application developers to relate UI models for different application development frameworks to further encourage consistency across applications regardless of the development framework under which they were developed.

In this manner, the flow of content from department to department, and from application to application, can be enabled with reduced application development effort while achieving a consistent look and feel across otherwise disconnected applications. Furthermore, changes to the taxonomy used by one or more departments, and changes to the types and structure of the content used by one or more departments, are automatically available to all business processes that are automated using the methods, apparatus, or systems described herein, thereby reducing cost and accelerating value delivered to the organization.

The technology disclosed herein may enable flow of content across departmental business process in spite of the tendency to implement content management solutions in a fragmented manner. The technology may provide the software tools consistent with the type, state, or level of current development frameworks. The technology may be directed to simplifying the user interface paradigms for enterprise applications wherein a user, acting within a role, interacts with data and content from across the organization.

Figure 13A:
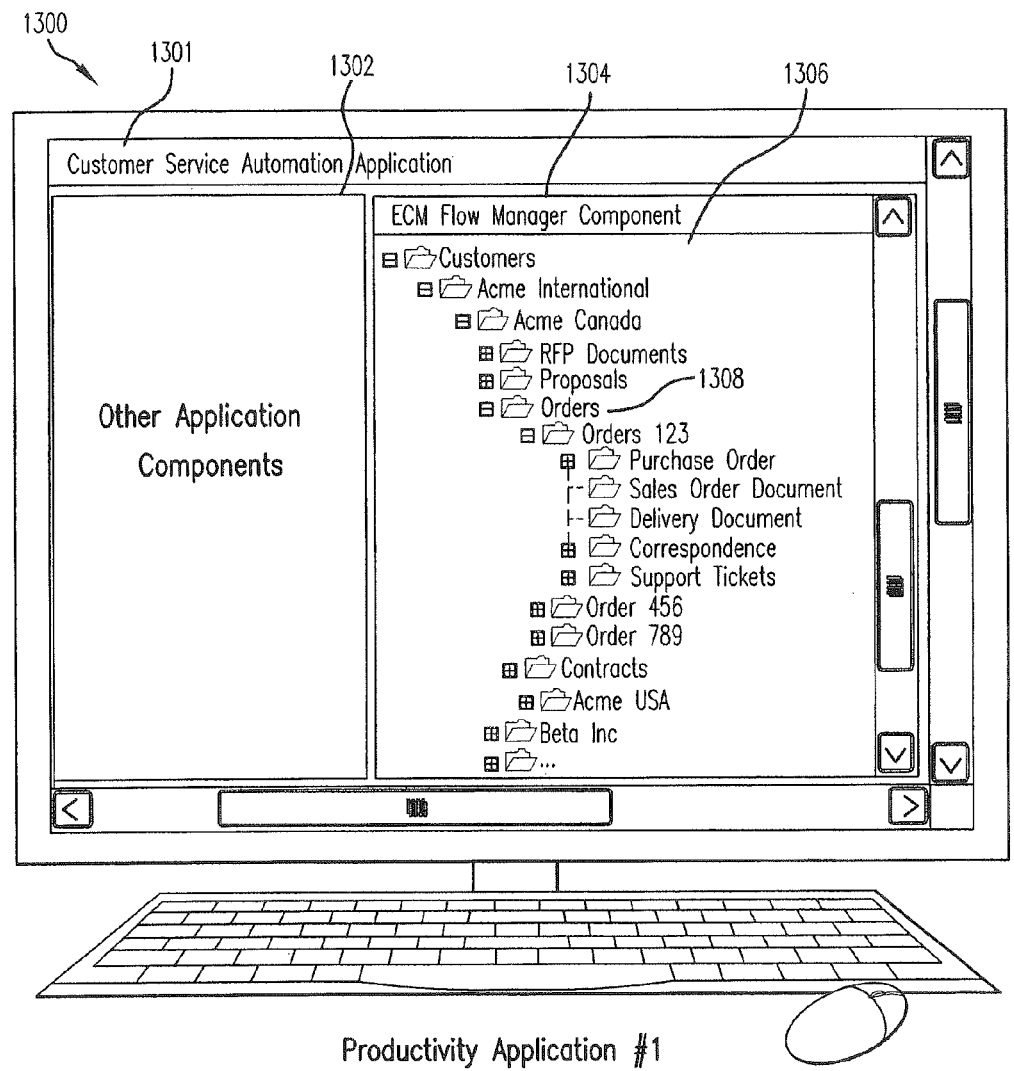
FIG. 13a-13b schematically illustrates an exemplary business productivity applications accessible from client computers.
Figure 13B:
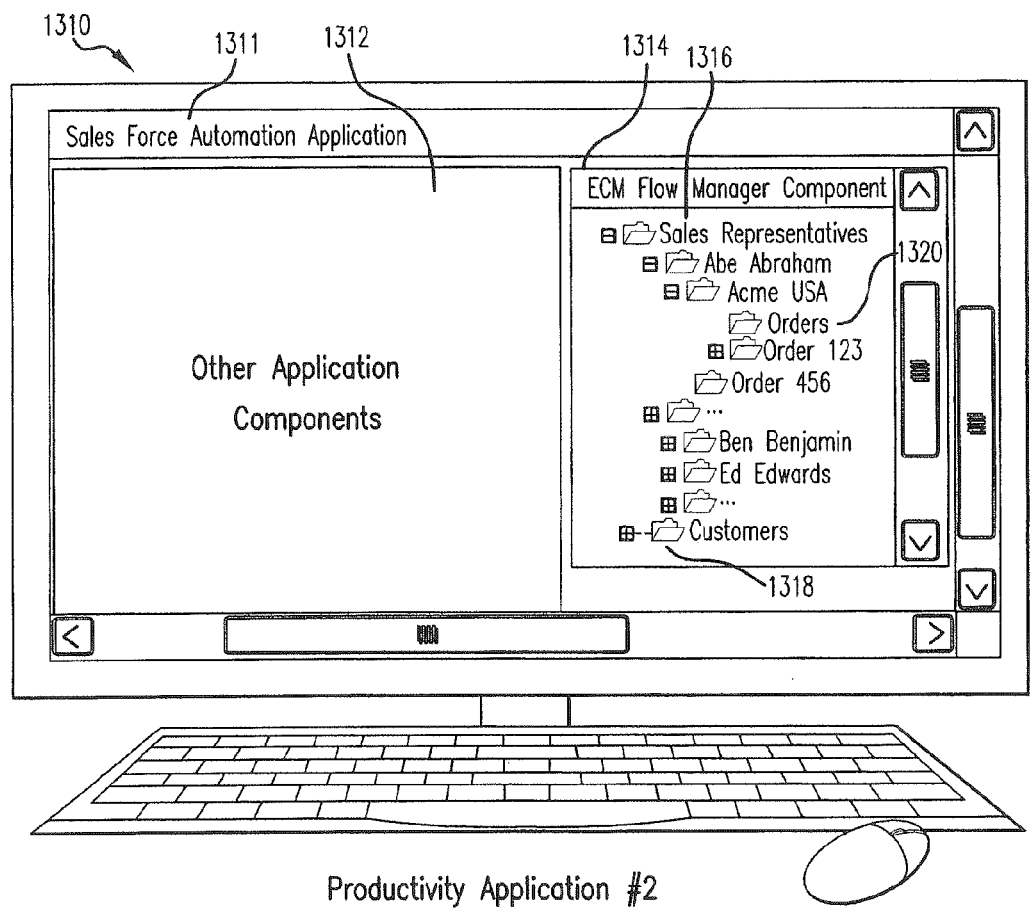

FIGS. 13*a* and 13*b* depict two exemplary business productivity applications accessible from client computers 1300 and 1310. The user of computer 1300 is performing Customer Service activities automated with Customer Service Automation Application Software 1301, which has standard components 1302 designed by the vendor of said application software. The user of computer 1310 is performing Sales activities automated with Sales Force Automation Application Software 1311, which has standard components 1312 designed by the (different) vendor of said application software.

Using the design time environment 920 of the FIG. 9, each of these business productivity applications can be extended to include access to related content from various sources and stored in various repositories. The designer of productivity application #1 has embedded a user interface component 1304 that renders for display a UI model designed using UI Modeler 920 which renders for display a Customer Service-oriented virtual folder model 1306 that was modeled using Virtual Folder Modeler 926. The Customer Service-oriented virtual folder model 1306 has been designed to reference several content models designed using Content Modeler 924, including the Orders content model 1308, which renders for display the orders belonging to a selected customer.

The designer of productivity application #2 has embedded a user interface component 1314 that renders for display a UI model designed using UI Modeler 920 which renders for display a Sales-oriented virtual folder model 1316 that was modeled using Virtual Folder Modeler 926. The Sales-oriented virtual folder model 1316 has been designed to reference several content models designed using Content Modeler 924, including the Orders content model 1320, which renders for display the orders belonging to a selected customer. Because the virtual folder modeler 920 and Content Modeler 924 are model-driven, both of these Virtual Folder models were designed by consuming a common Orders content model (1308 and 1320) that is shared between the Customer Service-oriented virtual folder model 1306 and the Sales-oriented virtual folder model 1316.

Another benefit is that virtual folder models can also be shared among UI components. For example, the Customer virtual folder model 1306 that was developed for the Customer Service-oriented UI component 1304 can be reused in the Sales-oriented virtual folder model 1314 so that the Customers virtual folder 1320 shares the same content and behavior between the two applications.

Because the components 1304 and 1314 interact with the ECM Flow Manager 600 system through a services oriented interface any changes made to the underlying content models 1308 and 1320 or to the virtual folder models 1306, 1316 and 1318 are dynamically reflected in the productivity applications 1301 and 1311 when UI components 1304 and 1314 are rendered for display. In the prior art, such changes would require recompilation of each application.

Figure 14A:
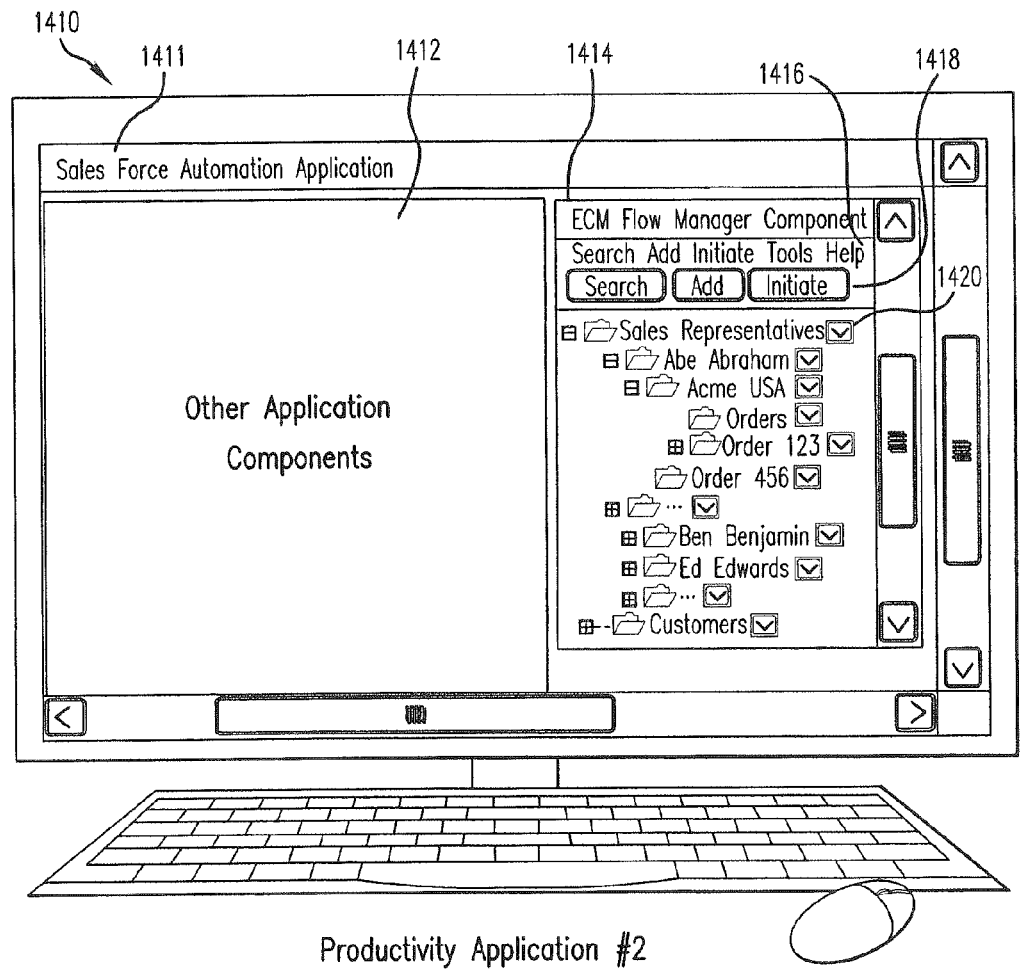
FIG. 14a-14b schematically illustrates an exemplary application of user interface controls within business productivity applications.

FIG. 14*a* shows that the component rendered in the productivity application 1411 may include controls 1420 1416 1418 providing access to the actions available to the user at any node as configured in the content model or the virtual folder model. The actions may be presented to the user in a dropdown menu 1440 as by clicking on the control 1420 displayed next to the node. If desired, the actions may be presented to the user in a menu 1416 outside the folder display as at the top of the component. A further embodiment is to present the actions (or selected actions as configured for the component) as buttons 1418 outside the folder display.

Figure 14B:
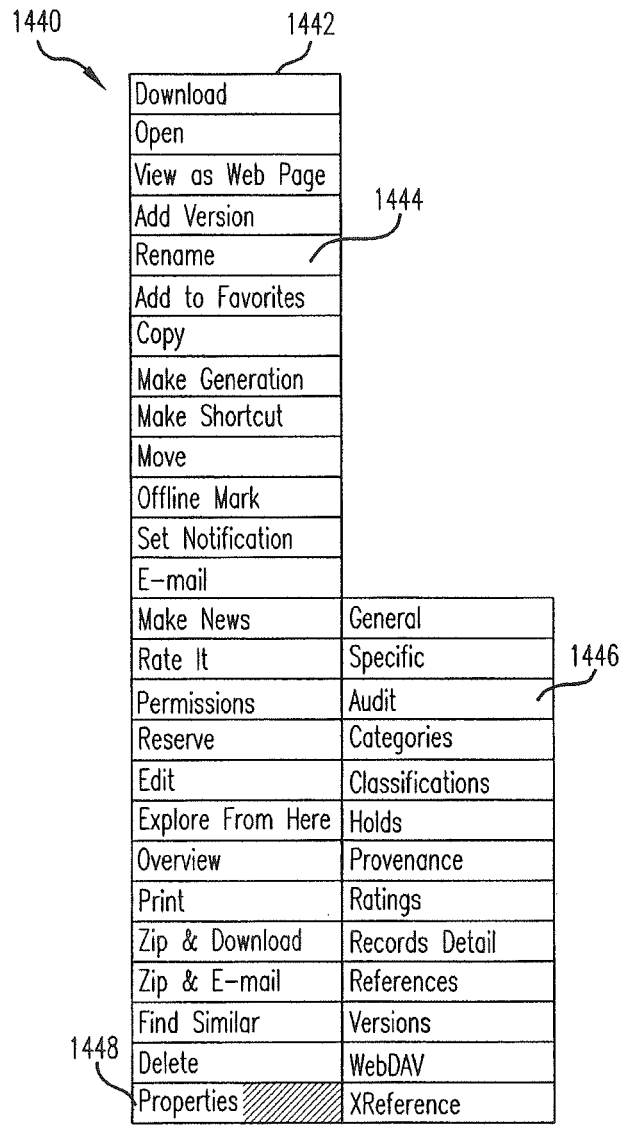

FIG. 14*b* is an exemplary drop down menu 1440 listing the actions 1442 available to the user for a particular content object. Some of these actions may be native to the content management system in which the content object resides. Other of the actions may enhance or transform the object as described above. An embodiment may also present actions in a sub-menu 1446 activated by selecting one of the menu options 1448. Such a menu may be dynamically generated as in our pending application Ser. No. 11/145,480, incorporated herein by reference in its entirety.

Figure 15:
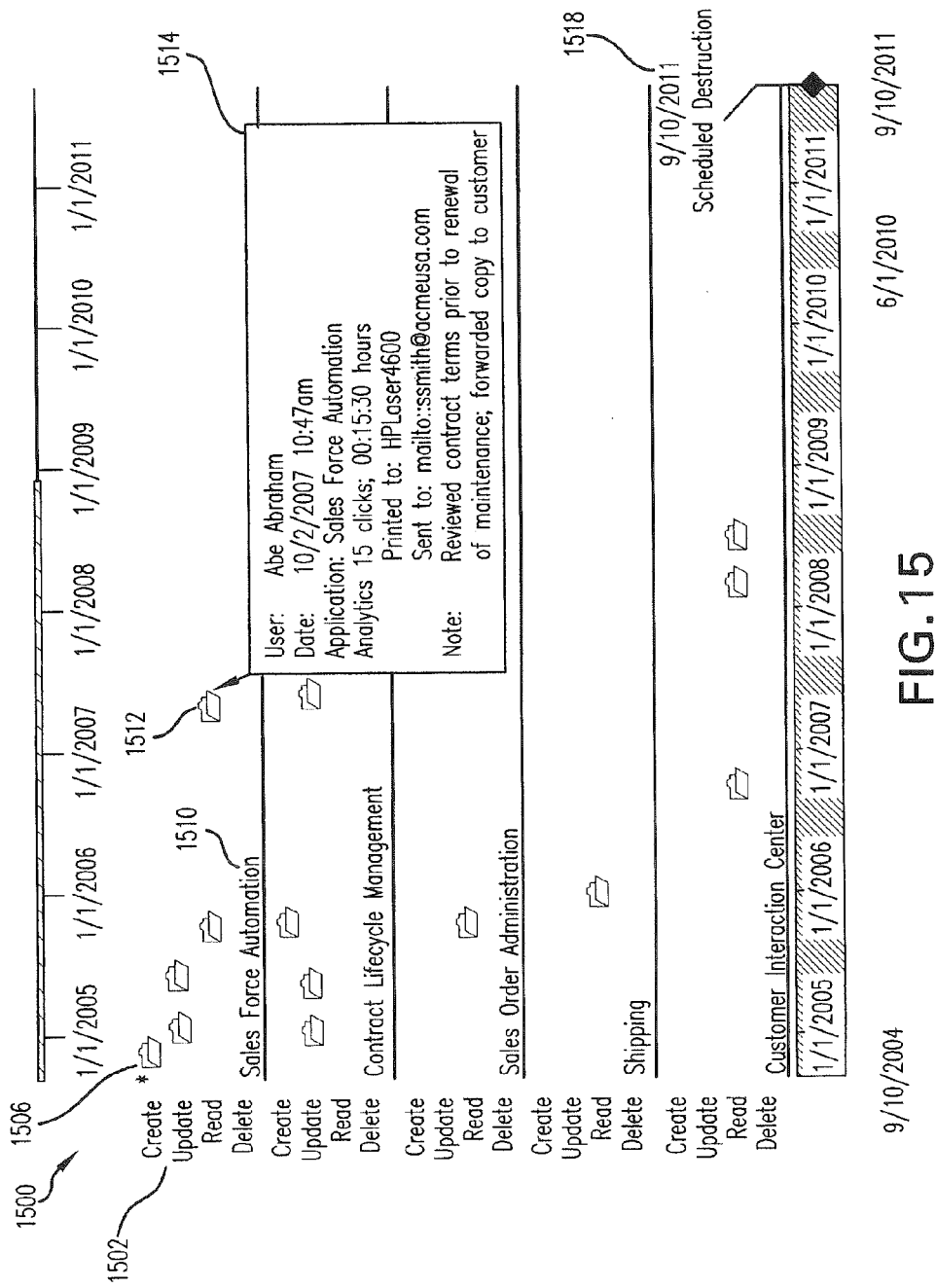
FIG. 15 schematically illustrates an exemplary report of the audit history of the usage of content.

FIG. 15 is an embodiment of a report 1500 that uses the audit history for a content object, in this example, a contract document or binder, showing how that content object "flows" (i.e., a map flow) through an organization and/or the business process of the organization. It depicts the timeline from object creation 1506 to scheduled destruction 1518 with icons showing each event in the audit history within "swimlanes" for each specific productivity application. In this example there are five productivity applications: "Sales Force Automation", "Contract Lifecycle Management", "Sales Order Administration", "Shipping", and "Customer Interaction Center". In this embodiment, actions such as "Create", "Update", "Read", "Delete" are in subdivisions 1502 of the swimlane, but they could be shown in another manner such as by different icons. In this embodiment, the details for an event can be displayed by clicking or hovering over an icon 1512——as for example here where the details 1514 include the user, the date and time, certain "analytics" such as number of clicks and the duration of the event, and certain actions that were performed such as "Print" and "Send To". Of course, this is just an example and other actions could be shown and the results could be obtained in a visual display (as shown) or in report format suitable for printing. In one embodiment, the analysis is presented in a visual format other than swimlanes. For example, the analysis could be in report format, or through a 3-d visualization tool; etc.

Further analysis could be performed by comparing the sequence of events for this content object with other content objects and/or with other performers in the same role to identify patterns that could be used to identify ways in which each productivity application or the overall process might be modified to enhance efficiency.

As used herein, the term interactive refers to information that is displayable and controllable within a user interface. As used herein, the team "content" refers to unstructured or semi-structured data that is mappable onto a metadata defining the content. Content may come from various sources and formats—e.g., RSS feeds, Blogs, Wikis, web pages, twitter postings, video, photo, etc. In one embodiment, the content comprises documents. If desired, content may be more complex than "document" in the traditional sense—e.g., a contract with exhibits and attachments, renditions with signatures, etc. In other embodiment, content may also be less complex than a traditional document—e.g., social networking content such as a blog comment.

The models that are referred to herein are generally independent of a presentation framework. In one embodiment, the models are an abstract representation of the content and the relationship of the content in a virtual folder paradigm that can be rendered in various ways as appropriate, desired, or necessary to allow the user to access the content and actions within a productivity application of arbitrary design and construction. The models may be rendered within a component that understands the technical details of how to render the data produced for an instance of the model within the application interface. The application interface may be designed and built using an application development tool—therefore, there needs to be a component for each such tool that can interpret the models and use the facilities of the application development environment to produce the best visual representation of the data and the best and most usable representation of the actions (i.e., as controls in the interface).

In one embodiment, metadata of the model and the content may be gathered from or based on a plurality of sources. For example, in the contract case, there may be emails about the contract; instant messages about the contract; someone may use a wiki to author the contract; someone may have a blog about the contract; there may be an RSS feed to notify people about changes to the contract draft during review; etc. All of these pieces of "meta content" could similarly be related to the contract and represented in one or more additional swimlanes in the FIG. 15 embodiment or in reports about the content. If desired, the timeline of any "document" may be reconstructed based on the activities performed by individuals within applications that create and consume content. If desired metadata may be generated or determined from non-traditional application frameworks—e.g., embedded in an email client so that someone can relate an email to the business context of another piece of content (e.g., to our contract); embedded in a web-based social networking system so that a blog or wiki can be used to relate content to the business context; and so forth.

"Customizing and Administration Guide for Livelink DocuLink for SAP Solutions", IXOS Software AG 2006 describes configuration of a virtual folder view of content using the customizing tool for SAPGUI and DocuLink. It addresses the mapping of key fields in order to produce the view and it also includes information on how to map to external data. However, the technology described therein have several shortcomings.

In one embodiment, the methods, systems, and apparatuses described herein provides having a place for storing abstract models for the content and the views; adding a level for UI model to reduce the effort on the part of the application designer who wants a consistent user interface between a plurality of productivity applications developed using different development frameworks; and providing for actions and events to be modeled in the content and view so that they can appear in the user interfaces and make the content actionable.

In other embodiments, the flow manager configured to provide content as describe herein may be configured to deny access to content, wherein a response to a request for the content is a denial response that limits access to the content based on, for example, an authentication ticket of the user. In one embodiment, the system may deny access based on rules rather than granting access based on permission lists. An example of an application for such denial is in law firms where you want to prevent conflicts of interest by explicitly listing the individuals who must not have access to content, as well as listing those individuals (or groups, or roles) who may have access to content. The system computes the individuals who may have access and eliminates those individuals who are explicitly listed to deny access.

Based on the foregoing, illustrative embodiments have been described to provide an overall understanding of the systems and methods for managing enterprise content. One or more examples of the illustrative embodiments are shown in the drawings. The disclosed systems and methods can be adapted and modified to provide systems and methods for other applications, and that other additions and modifications can be made to the disclosed systems and methods without departing from the scope of the present disclosure. For example, features of the illustrative embodiments can be combined, separated, interchanged, and/or re-arranged to generate other embodiments. Such modifications and variations are intended to be included within the scope of the present disclosure.

The systems and methods described herein are not limited to a hardware or software configuration; they can find applicability in many computing or processing environments. The systems and methods can be implemented in hardware or software, or in a combination of hardware and software. The systems and methods can be implemented in one or more computer-readable storage medium (including computer programs), in which a medium/computer program can be understood to include one or more processor-executable instructions. The computer programs can execute on one or more programmable processors, and can be stored on one or more storage media readable by the processor, comprising volatile and non-volatile memory and/or storage elements.

The computer programs can be implemented in high level procedural or object oriented programming language to communicate with a computer system. The computer programs can also be implemented in assembly or machine language. The language can be compiled or interpreted.

The computer programs can be stored on a storage medium or a device (e.g., compact disk (CD), digital video disk (DVD), magnetic tape or disk, internal hard drive, external hard drive, random access memory (RAM), redundant array of independent disks (RAID), or removable memory device) that is readable by a general or special purpose programmable computer for configuring and operating the computer when the storage medium or device is read by the computer to perform the methods described herein.

Unless otherwise provided, references herein to memory can include one or more processor-readable and -accessible memory elements and/or components that can be internal to a processor-controlled device, external to a processor-controlled device, and/or can be accessed via a wired or wireless network using one or more communications protocols, and, unless otherwise provided, can be arranged to include one or more external and/or one or more internal memory devices, where such memory can be contiguous and/or partitioned based on the application.

Unless otherwise provided, references herein to a/the processor and a/the microprocessor can be understood to include one or more processors that can communicate in stand-alone and/or distributed environment(s) and can be configured to communicate via wired and/or wireless communications with one or more other processors, where such one or more processor can be configured to operate on one or more processor-controlled devices that can include similar or different devices. Use of such processor and microprocessor terminology can be understood to include a central processing unit, an arithmetic logic unit, an application-specific integrated circuit, and/or a task engine, with such examples provided for illustration and not limitation.

Unless otherwise provided, use of the articles "a" or "an" herein to modify a noun can be understood to include one or more than one of the modified noun.

While the systems and methods described herein have been shown and described with reference to the illustrated embodiments, those of ordinary skill in the art will recognize or be able to ascertain many equivalents to the embodiments described herein by using no more than routine experimentation. Such equivalents are encompassed by the scope of the present disclosure and the appended claims. Accordingly, the systems and methods described herein are not to be limited to the embodiments described herein, can include practices other than those described, and are to be interpreted as broadly as allowed under prevailing law.

What is claimed is:

1. A computer-implemented method for searching for data and managing a plurality of different types of content, comprising:
    receiving a request for visualizing content within a presentation framework, wherein the presentation framework is configured to interpret a user interface model for rendering the content, the content having content metadata and an associated type of native application, wherein the native application has at least one associated generic content service or an associated custom content service, wherein the associated generic content service supports actions that are common across different native applications and the associated custom content service supports actions that are unique to the native application;
    determining a model of the content configured for provisioning within the presentation framework based on a process step within a process;
    sending a search query associated with the content to a plurality of content repositories configured to store the plurality of different types of content and to index the content for searching, the content repositories including at least one content management repository for storing the content metadata;
    receiving the content metadata of the content from a selected one of the plurality of content repositories;
    exposing, to a process that consumes an object model, an object property-to-property mapping based on mapping model metadata to the content in the presentation framework;
    providing an interactive instance of a portion of the content within the presentation framework based on the property-to-property mapping; and
    determining a user-interface control provided through the presentation framework based on the model metadata and the content metadata, wherein the user-interface control provides at least one generic content service and a custom content service based on the type of native application of the content.

2. The method of claim 1, wherein the process includes parameters identifying resources to perform the process or defining deliverables.

3. The method of claim 1, wherein determining the model comprises determining a model metadata for the plurality of content of different types.

4. The method of claim 1, further comprising:
    associating an additional activity with the content; and
    augmenting the content metadata with additional information associated with the additional activity.

5. The method of claim 1, further comprising:
    sending the search query for the content to a plurality of productivity application environment configured to provide content of the plurality of different types.

6. The method of claim 1, wherein the search index is an embedded search index.

7. The method of claim 1, wherein exposing the object property-to-property mapping further comprises:
    exposing the object property-to-property mapping to a defined group of users within the user interface control.

8. A system for providing, over a network, a user interface for searching for data and managing content, comprising:
    one or more computers configured to implement a metadata mapping component configured to perform actions comprising:
        receiving a request for visualizing content within a presentation framework, wherein the presentation framework is configured to interpret a user interface model for rendering the content, the content having metadata and an associated type of native application, wherein the native application has at least one associated generic content service or an associated custom content service, wherein the associated generic content service supports actions that are common across different native applications and the associated custom content service supports actions that are unique to the native application;
        determining a model of the content configured for provisioning within the presentation framework based on a process step within a process;
        sending a search query associated with the content to a plurality of content repositories configured to store the plurality of different types of content and to index the content for searching, the content repositories including at least one content management repository for storing the content metadata;
        receiving the content metadata of the content from a selected one of the plurality of content repositories;
        exposing, to a user or a process that consumes an object model, an object property-to-property mapping based on mapping model metadata to the content in the presentation framework;
        providing an interactive instance of a portion of the content within the presentation framework based on the property-to-property mapping; and
        determining a user interface control provided through the presentation framework based on the model metadata and the content metadata, wherein the user interface control provides at least one generic content service and a custom content service based on the type of native application of the content.

9. The system of claim 8, wherein the process includes parameters identifying resources to perform the process or defining deliverables.

10. The system of claim 8, wherein determining the model comprises determining a model metadata for the plurality of content of different types.

11. The system of claim 8, further comprising:
adding additional external content data to the content based on an activity within a work flow, wherein adding additional content data comprises: including content metadata based on an activity within a work flow.

12. The system of claim 8, wherein searching further comprises:
sending the search query for the content to a plurality of productivity application environment configured to provide content of the plurality of different types.

13. The system of claim 8, wherein the search index is an embedded search index.

14. The system of claim 8, the search engine is configured to extract data and content from one or more external data management system and index the extracted data and content in the search index in order to optimize a query expression passed into the search engine.

15. The system of claim 8, wherein exposing the object property-to-property mapping further comprises:
exposing the object property-to-property mapping to a defined group of users.

16. A non-transitory processor readable medium for searching for data and managing content, the medium comprising instructions that when executed by a processor causes the processor to perform actions that comprise:
receiving a request for visualizing content within a presentation framework, wherein the presentation framework is configured to interpret a user interface model for rendering the content, the content having content metadata and an associated type of native application, wherein the native application has at least one associated generic content service or an associated custom content service, wherein the associated generic content service supports actions that are common across different native applications and the associated custom content service supports actions that are unique to the native application;
determining a model of the content configured for provisioning within a presentation framework based on a process step within a process;
sending a search query associated with the content to a plurality of content repositories configured to store the plurality of different types of content and to index the content for searching, the content repositories including at least one content management repository for storing the content metadata;
receiving the content metadata of the content from a selected one of the plurality of content repositories;
exposing, to a user or a process that consumes an object model, an object property-to-property mapping based on mapping model metadata to the content in the presentation frame work;
providing an interactive instance of a portion of the content within the presentation framework based on the property-to-property mapping; and
determining a user interface control provided through the presentation framework based on the model metadata and the content metadata, wherein the user interface control provides at least one generic content service and a custom content service based on the type of native application of the content.

17. The processor readable medium of claim 16, wherein the search index is an embedded search index.

18. The processor readable medium of claim 17, further comprising adding additional content data, which comprises:
including content metadata based on an activity within a work flow.

19. The processor readable medium of claim 18, comprising further instructions that, when executed, operate to cause one or more computers to perform the operation comprising:
sending the search query for the content to a plurality of productivity application environment configured to provide content of the plurality of different types.

* * * * *